(12) United States Patent
Oikawa

(10) Patent No.: US 9,729,813 B2
(45) Date of Patent: Aug. 8, 2017

(54) SIGNAL DETERMINATION APPARATUS, OPTICAL PROJECTION APPARATUS, SIGNAL DETERMINATION METHOD, AND STORAGE MEDIUM

(71) Applicant: Tatsuyuki Oikawa, Tokyo (JP)

(72) Inventor: Tatsuyuki Oikawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 427 days.

(21) Appl. No.: 14/337,280

(22) Filed: Jul. 22, 2014

(65) Prior Publication Data

US 2015/0030316 A1    Jan. 29, 2015

(30) Foreign Application Priority Data

Jul. 24, 2013 (JP) .................................. 2013-153843

(51) Int. Cl.

| | |
|---|---|
| *G09G 3/36* | (2006.01) |
| *H04N 5/74* | (2006.01) |
| *H04N 5/46* | (2006.01) |
| *G09G 5/00* | (2006.01) |
| *H04N 7/01* | (2006.01) |

(52) U.S. Cl.
CPC ........... *H04N 5/7408* (2013.01); *G09G 5/005* (2013.01); *H04N 5/46* (2013.01); *H04N 7/01* (2013.01); *H04N 7/0122* (2013.01)

(58) Field of Classification Search
CPC ............... G09G 3/3688; G09G 3/3648; G09G 2330/021
See application file for complete search history.

(56) References Cited

U.S. PATENT DOCUMENTS

| | | | |
|---|---|---|---|
| 2006/0279750 A1* | 12/2006 | Ha | H04N 13/0454 358/1.2 |
| 2010/0238091 A1 | 9/2010 | Katsuyama | |
| 2011/0112401 A1* | 5/2011 | Watanaba | A61B 8/13 600/443 |
| 2012/0057070 A1* | 3/2012 | Park | H04N 5/23212 348/345 |

FOREIGN PATENT DOCUMENTS

| | | |
|---|---|---|
| JP | 2009-192986 | 8/2009 |
| JP | 2009-288688 A | 12/2009 |
| JP | 2010-218471 | 9/2010 |

\* cited by examiner

*Primary Examiner* — Carolyn R Edwards
*Assistant Examiner* — Mansour M Said
(74) *Attorney, Agent, or Firm* — Harness, Dickey & Pierce, P.L.C.

(57) ABSTRACT

A signal determination apparatus for determining a format of an input image signal input from an image data output apparatus includes a storage unit to store numerical values of at least three parameters for defining a format of each of a plurality of image signals; and a determination unit to determine a format of the input image signal based on numerical values of at least three parameters of the input image signal and the numerical values of at least three parameters stored in the storage unit.

7 Claims, 18 Drawing Sheets

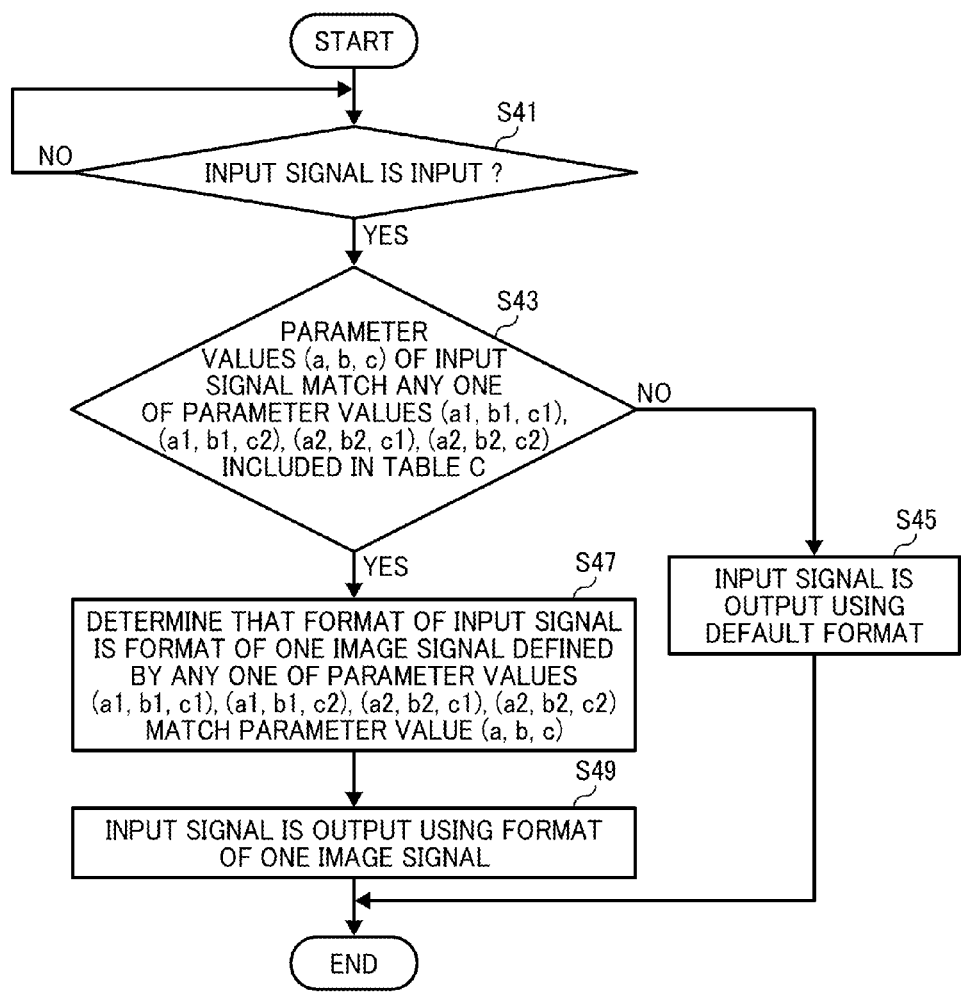

SIGNAL DETERMINATION APPARATUS, OPTICAL PROJECTION APPARATUS, SIGNAL DETERMINATION METHOD, AND STORAGE MEDIUM

CROSS-REFERENCE TO RELATED APPLICATION

This application claims priority pursuant to 35 U.S.C. §119(a) to Japanese Patent Application No. 2013-153843, filed on Jul. 24, 2013 in the Japan Patent Office, the disclosures of which are incorporated by reference herein in their entirety.

BACKGROUND

Technical Field

The present invention relates to a signal determination apparatus, an optical projection apparatus and a signal determination method, and more particularly, a signal determination apparatus to determine a format of an input image signal, an optical projection apparatus including the signal determination apparatus, and a signal determination method to determine a format of an image signal input from an image data output apparatus.

Background Art

Conventionally, technologies to determine a format of input signal based on update-able determination condition data are known. However, conventional technologies may erroneously determine a format of input signal.

SUMMARY

In one aspect of the present invention, a signal determination apparatus for determining a format of an input image signal input from an image data output apparatus is devised. The signal determination apparatus includes a storage unit to store numerical values of at least three parameters for defining a format of each of a plurality of image signals; and a determination unit to determine a format of the input image signal based on numerical values of at least three parameters of the input image signal and the numerical values of at least three parameters stored in the storage unit.

In another aspect of the present invention, a method of determining a format of an image signal output from an image data output apparatus is devised. The method includes storing numerical values of at least three parameters for defining a format of each of a plurality of image signals in a storage unit; and determining a format of the output image signal based on numerical values of the at least three parameters of the output image signal and the numerical values of the at least three parameters stored in the storage unit.

In another aspect of the present invention, a non-transitory computer-readable storage medium storing a program that, when executed by a computer having a processing circuit, causes the computer to execute a method of determining a format of an image signal output from an image data output apparatus is devised. The method includes storing numerical values of at least three parameters for defining a format of each of a plurality of image signals in a storage unit; and determining a format of the output image signal based on numerical values of the at least three parameters of the output image signal and the numerical values of the at least three parameters stored in the storage unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 20 is a flow chart showing the steps of control by the signal determination apparatus of the third example embodiment.

Figure 1:
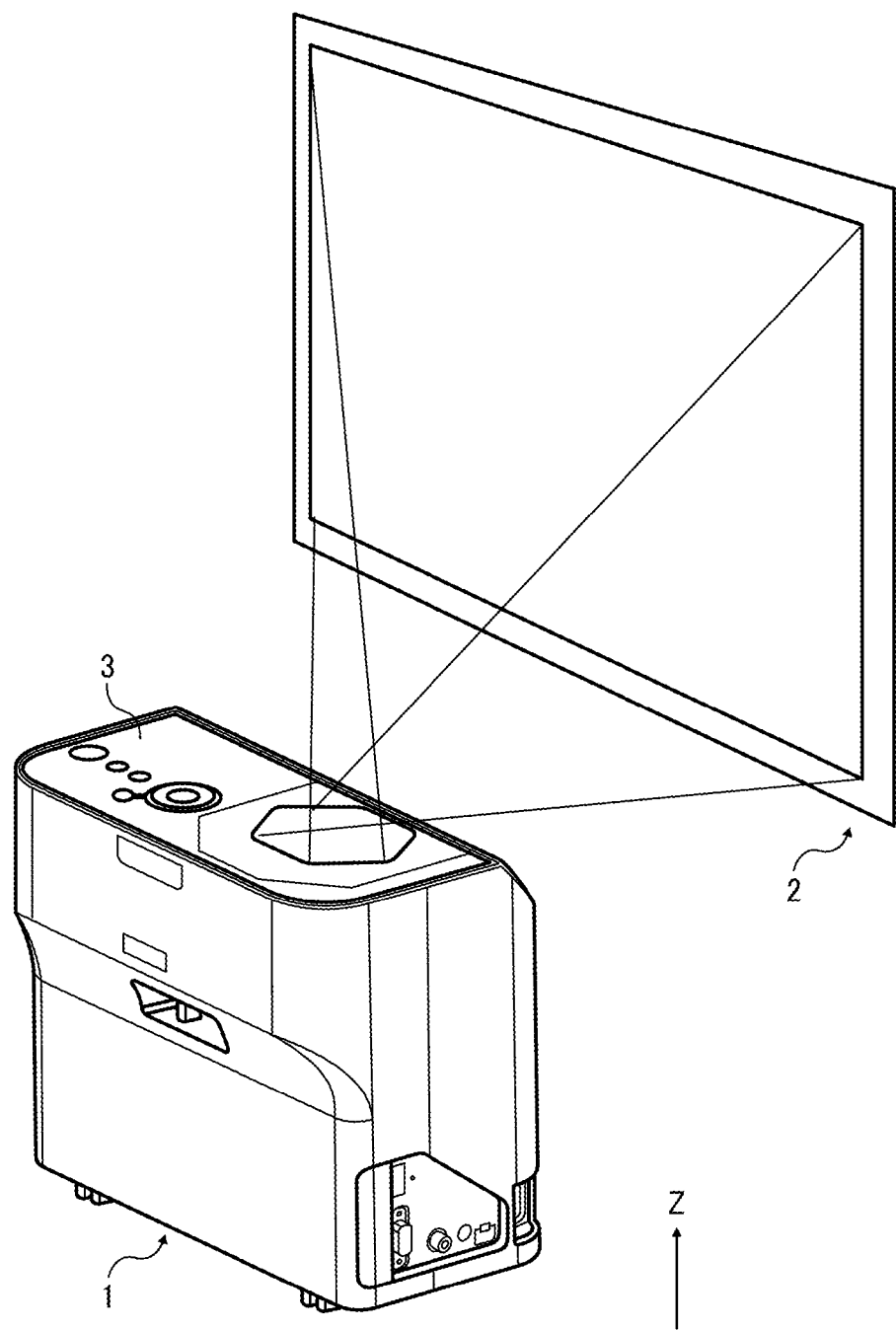
FIG. 1 is a perspective view of an image projection apparatus of a first example embodiment

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, an apparatus or system according to an example embodiment is described hereinafter.

First Example Embodiment

A description is given of a first example embodiment of the present invention with reference to drawings. FIG. 1 is a perspective view of a projector 1, used as an example of an optical projection apparatus of a first example embodiment, and a projection plane such as a screen 2. The projector 1 can generate images based on image data output from an image data output apparatus R (refer to FIG. 15) such as personal computers (PCs), video cameras, digital versatile disk (DVD) players, Blue ray players, tablet terminals, universal serial bus (USB) memories or the like, and projects the images on the screen 2 to display the images.

The projector 1 may be available as a liquid crystal projector having a liquid crystal panel enhancing resolution, a light source such as lamp enhancing light intensity by high efficient system, and such liquid crystal projector is available with lower prices. Further, the projector 1 may be available as a small light-weight projector using a micro drive mirror device such as digital micro-mirror device (DMD: registered trademark) Such projectors are widely used in offices, schools, and homes. Further, the projector 1 may be available as a front type projector having enhanced portability, with which the projector 1 can be used for a small meeting of several participants.

Figure 2:
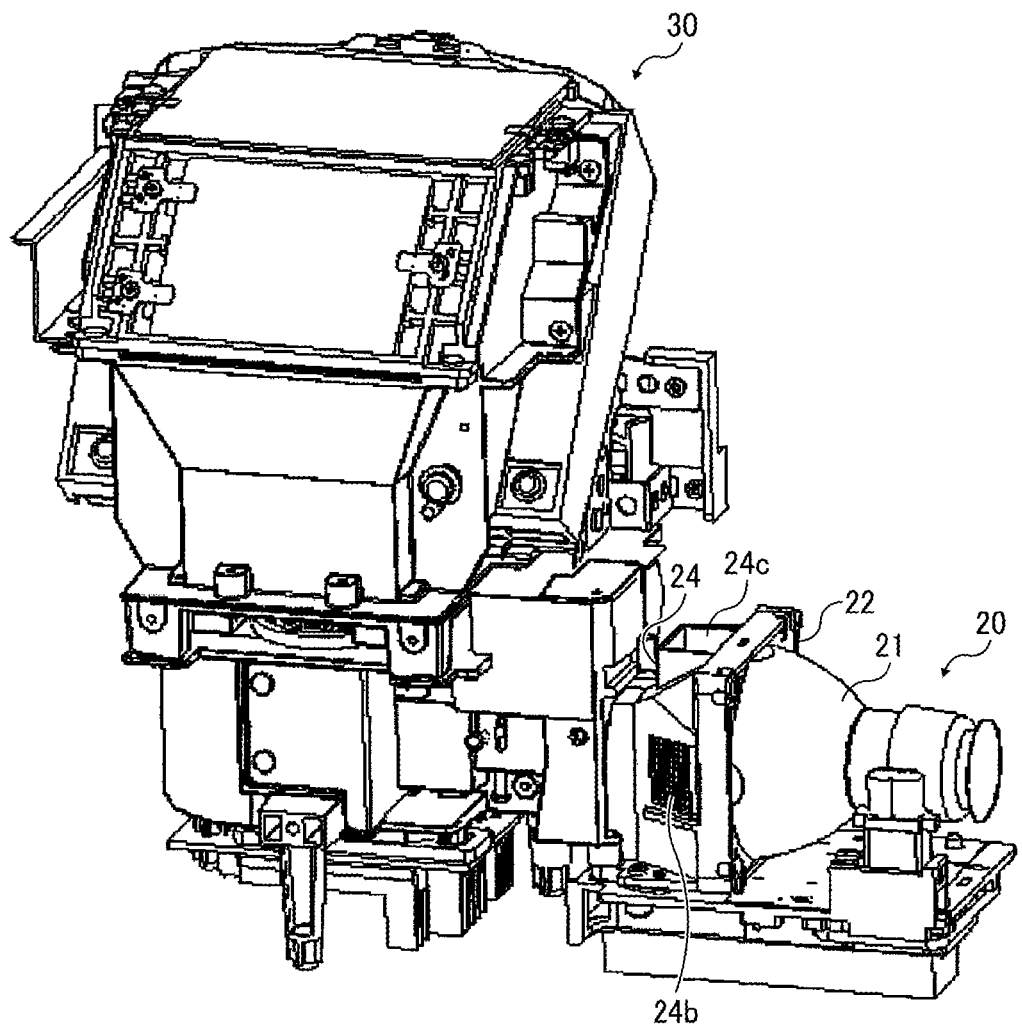
FIG. 2 is a perspective view of an optical engine unit and a light source unit of the image projection apparatus.

FIG. 2 is a schematic perspective view of an internal configuration of the projector 1 of FIG. 1 when an outer cover 3 is removed. As illustrated in FIG. 2, the projector 1 includes, for example, a light source unit 20, an optical engine unit 30, and a signal determination apparatus 10. In this description, +Z direction in FIG. 1 and other drawings is defined as the vertical upward direction.

The light source unit 20 includes a light source 21 and a light source bracket 22. The light source unit 20 controls the light source 21 to supply light required for image projection (e.g., white light) to the optical engine unit 30. The light source 21 is, for example, a halogen lamp, a metal-halide lamp, a high-pressure mercury vapor lamp, a laser but not limited thereto. The light-source bracket 62 is used as a support member that supports the light source 21.

Further, a holder 24 is fixed on the light exiting side of the light source 21 disposed on the light source bracket 22 by using screws, wherein the holder 24 retains a reflector or the like. Further, a light-exit window 23 (refer to FIG. 3) is disposed for the holder 24 while the light-exit window 23 is disposed at a side opposite a position of the light source 21. The light emitted from the light source 21 can be guided to the light-exit window 23 by the reflector retained in the holder 24, and exits from the light-exit window 23.

Further, a light-source air intake port 24b is disposed at a side face of the holder 24 to take in air used for cooling the light source 21, and a light-source air exhaust port 24c is disposed at the top face of the holder 24 to exhaust air heated by heat of the light source 21.

Figure 3:
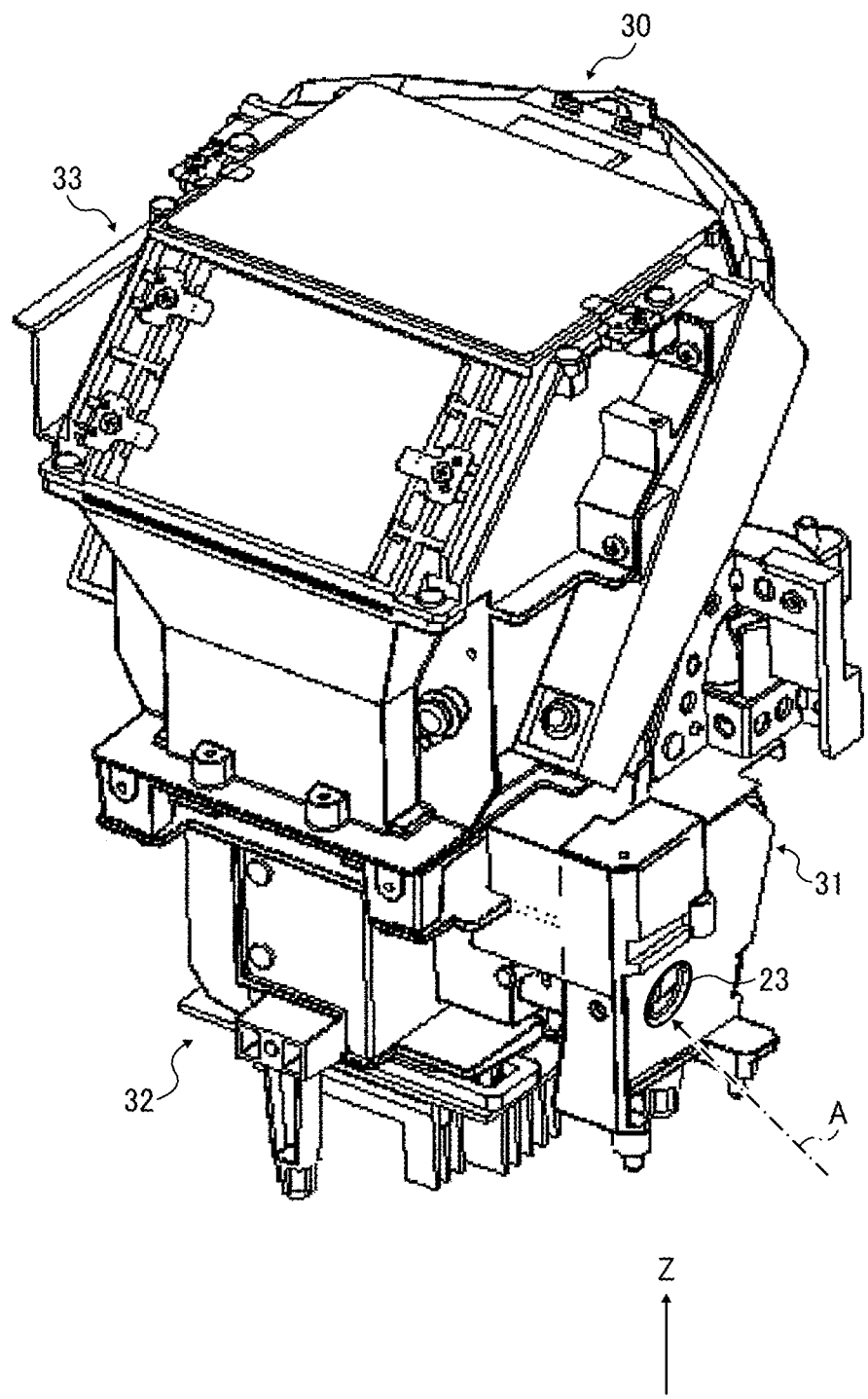
FIG. 3 is a perspective view of the optical engine unit.

The optical engine unit 30 controls processing and projection of input image data using light supplied from the light source unit 20. FIG. 3 is a schematic perspective view of the optical engine unit 30. The optical engine unit 30 includes, for example, an optical irradiation unit 31, an image processing unit 32, and an optical projection unit 33. White light coming from the light source unit 20 enters the optical irradiation unit 31. The optical irradiation unit 31 separates the white light coming from the light source unit 20 to RGB components, and guides the light to the image processing unit 32. The image processing unit 32 conducts image generation based on modulated signals. The optical projection unit 33 enlarges and projects an image generated by the image processing unit 32.

Figure 4:
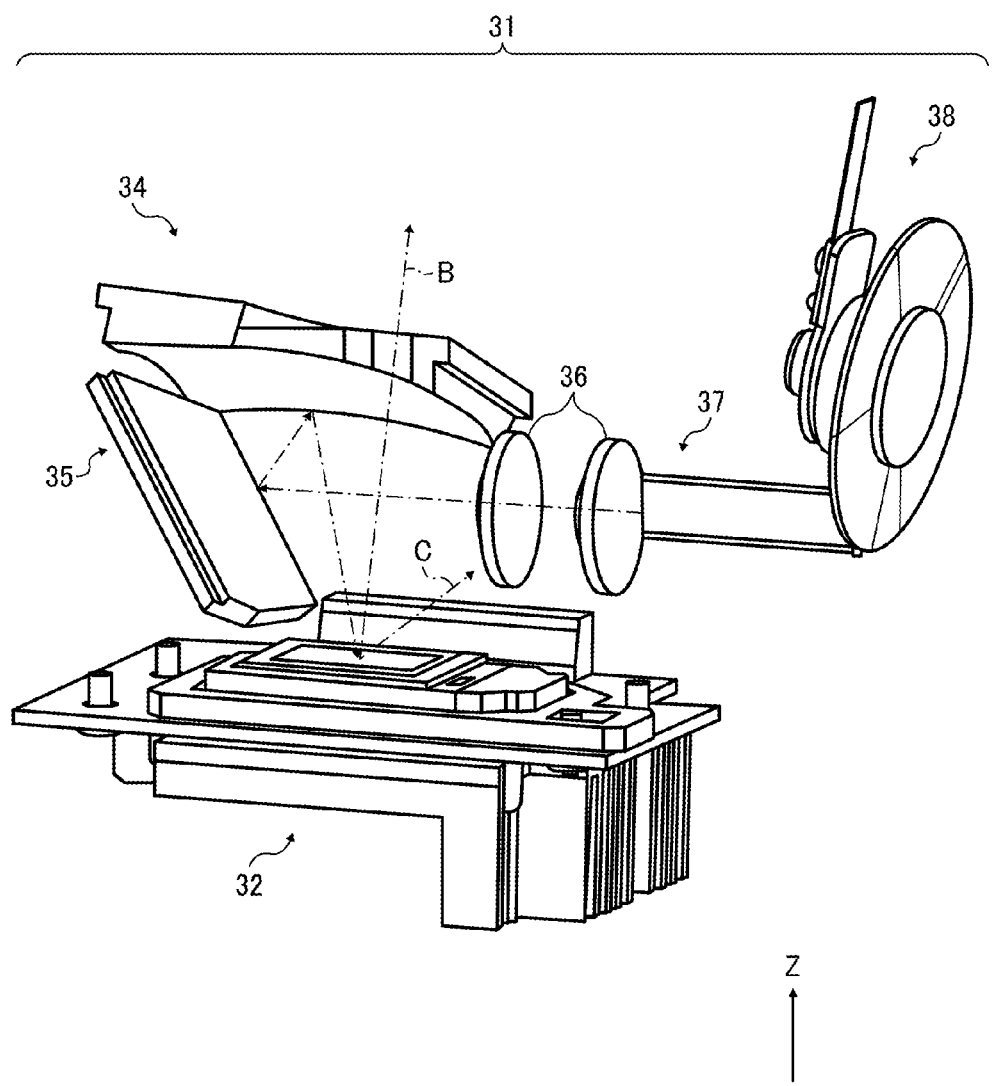
FIG. 4 is a perspective view of an optical irradiation unit and an image processing unit of an image projection apparatus.

FIG. 4 is a layout of the optical irradiation unit 31 and the image processing unit 32. The optical irradiation unit 31 includes, for example, a color wheel 38, a light tunnel 37, a relay lens 36, a cylinder mirror 35, and a concave mirror 34. The color wheel 38 has a disc shape color filter such as R (red), G (green), and B (blue) filters along the rotation direction. The white light emitted from the light source unit 20 is converted to light of R (red), G (green), and B (blue) per unit time and exited. The light tunnel 37 is a tube-shaped member composed of glass plates, and guides light exited from the color wheel 38. The relay lens 36 is composed of two lenses, and condenses light exited from the light tunnel 37 while correcting color aberration on the light axis.

The cylinder mirror 35 and the concave mirror 34 reflect light exited from the relay lens 36. The reflected light enters the image processing unit 32. The image processing unit 32 includes a digital micro mirror device (DMD) element composed of a plurality of movable micro mirrors arranged in a lattice pattern. Each of micro mirrors can be driven to incline the mirror face about a torsion shaft for a given angle based on image data time-divisionally to generate a projection light for forming a given image, and the projection light is reflected from the DMD element. In the image processing unit 32, light used by micro mirrors of the DMD element time-divisionally, based on image data, reflects to a direction of a projection lens 51 (refer to FIG. 6) indicated by an arrow B in FIG. 4, and light not used for the projection light reflects to a direction of an OFF plate indicated by an arrow C in FIG. 4.

Figure 5:
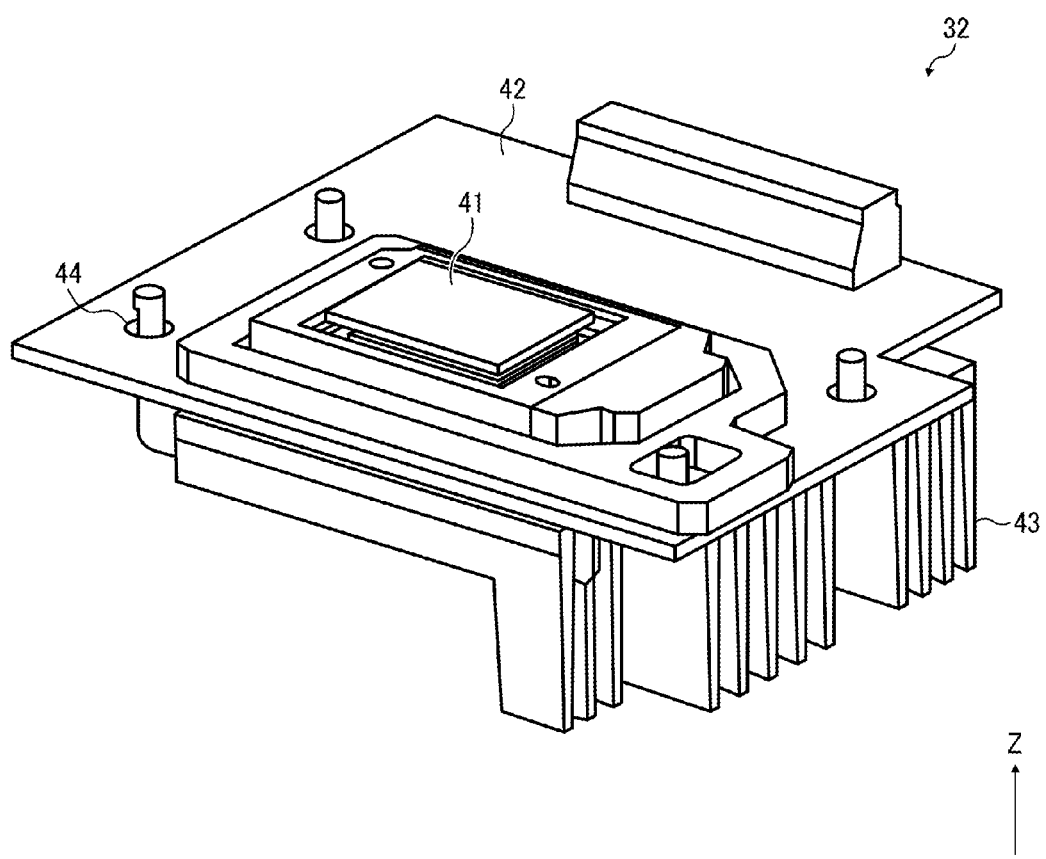
FIG. 5 is a perspective view of the image processing unit.
Figure 6:
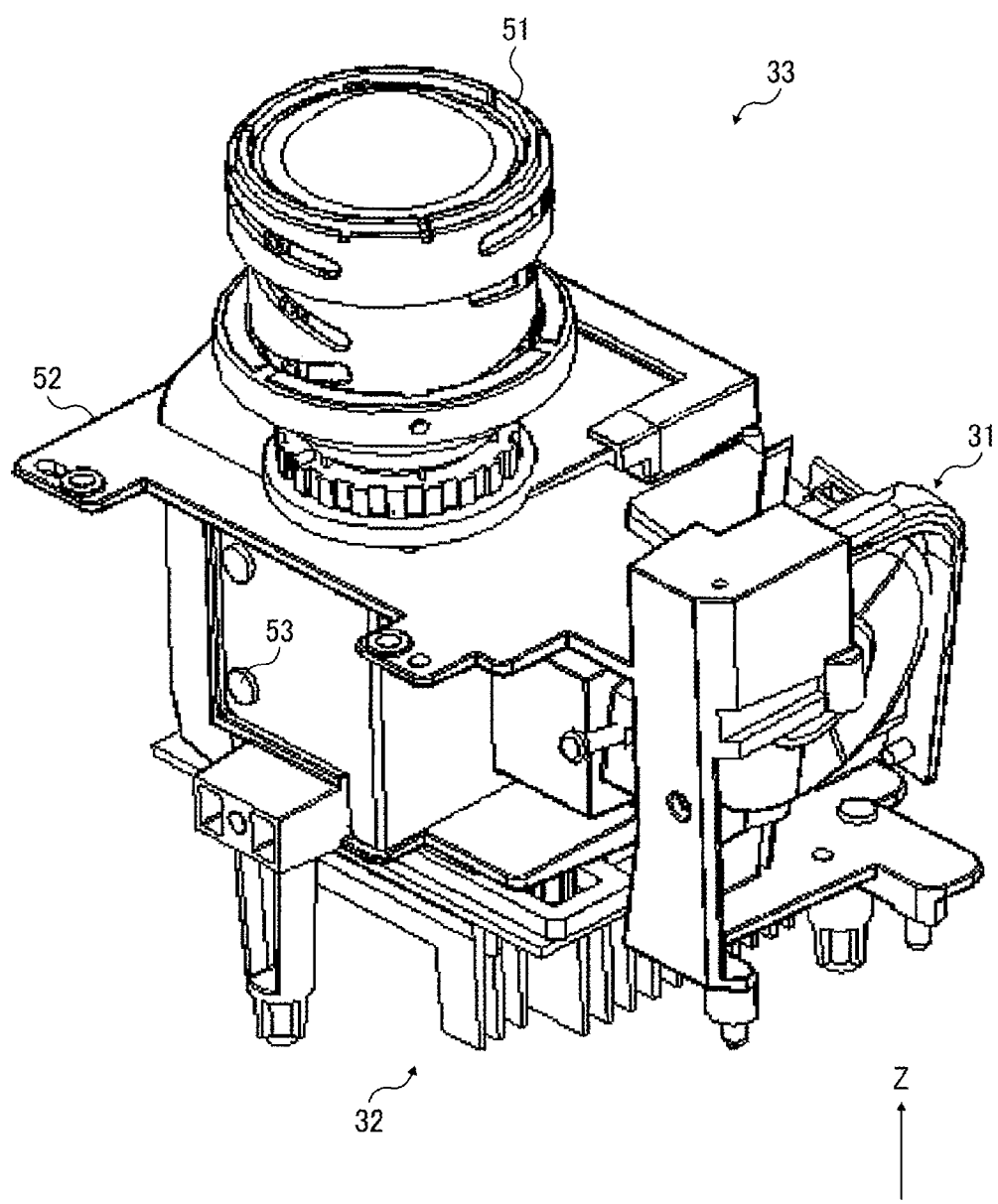
FIG. 6 is a perspective view of an optical projection unit of an image projection apparatus.

FIG. 5 is a schematic perspective view of the image processing unit 32. The image processing unit 32 includes a DMD element 41, a DMD print board 42 to control the DMD element 41, a heat sink 43 to cool the DMD element 41, and a fixing plate 44 to press the heat sink 43 to the MID element 41. The heat sink 43, contacted to the DMD element 41, dissipates heat from the DMD element 41. Further, FIG. 6 is a schematic perspective view of the optical projection unit 33. The light that has passed the image processing unit 32 is reflected to the projection lens 51 illustrated in FIG. 6, and the non-used light is reflected to a OFF plate 53 illustrated in FIG. 6.

Figure 7:
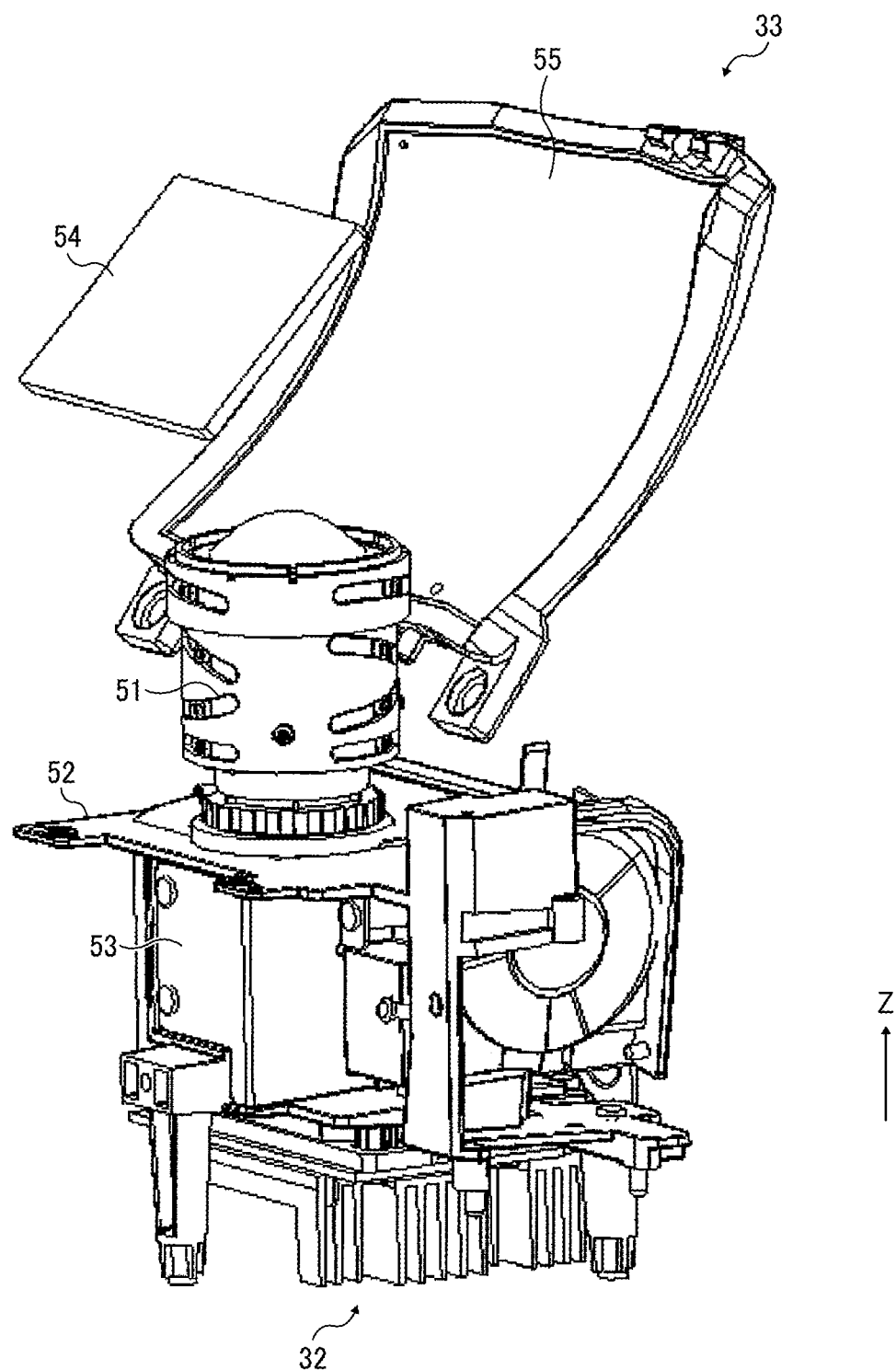
FIG. 7 is a perspective view of the optical projection unit.
Figure 8:
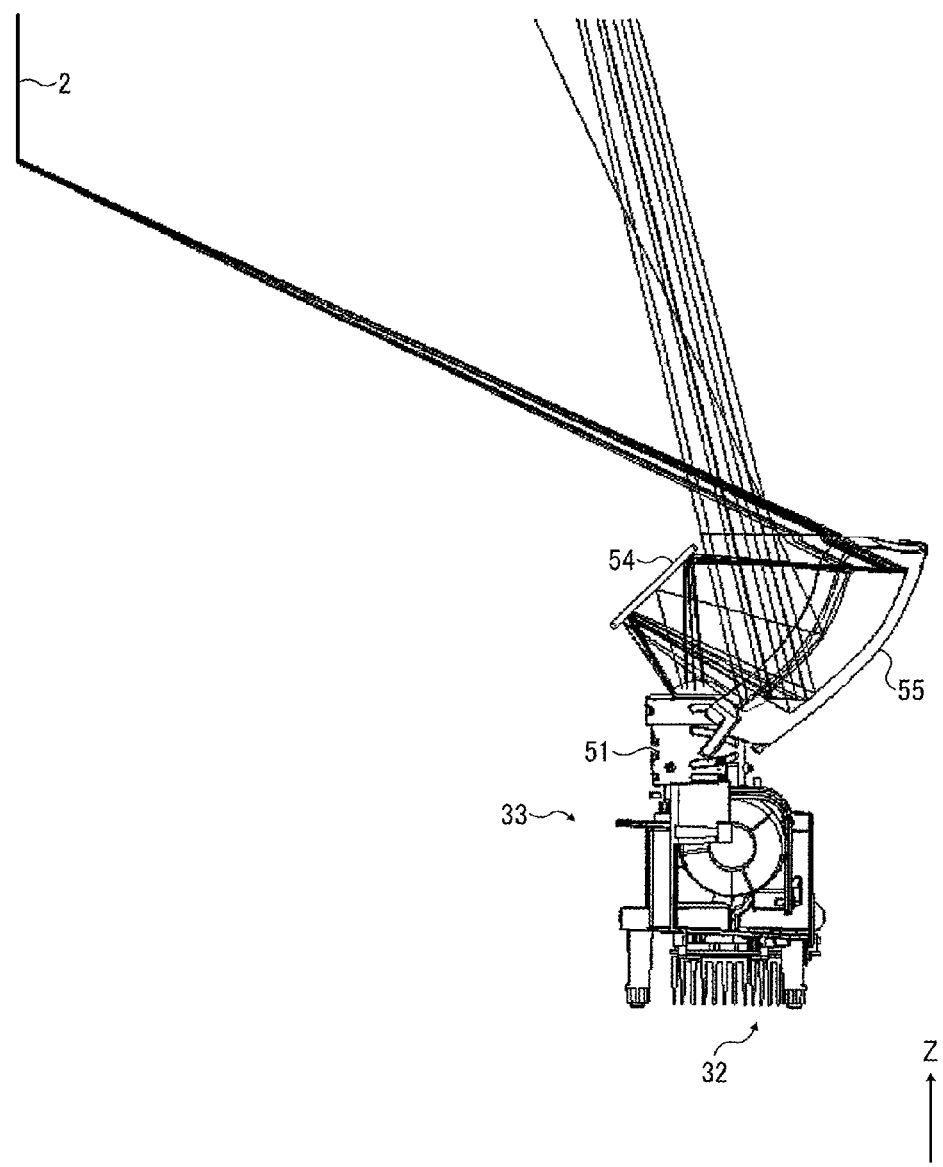
FIG. 8 is a side view of the optical projection unit.

FIG. 7 is a schematic perspective view of the optical projection unit 33, and FIG. 8 is a schematic side of the optical projection unit 33. Image light that has passed through the projection lens 51 and is enlarged is reflected by a reflection mirror 54, and is then enlarged by a free-curved mirror face 55 and then projected on the screen 2. With the above described configuration, the optical engine unit 30 can be disposed close to the screen 2, and the optical engine unit 30 can be designed as a vertical configuration having a smaller occupation area and compact in size.

An image data output apparatus R (see FIG. 15) connected to the projector 1 generates an electrical signal such as an image signal based on image data per one frame, and outputs the image signal. The output image signal is input to the projector 1.

The image processing unit 32 of the projector 1 generates a modulated signal based on the input image signal, controls the DMD element 41 based on the generated modulated signal, and projects an image on the screen 2 by scanning the screen 2 in the vertical direction (Z-axis direction) at a low speed and scanning the screen 2 reciprocally in the horizontal direction at a high speed.

In the above described configuration, the projector 1 needs to determine a format of image signal correctly or high precision to generate and project an image on the screen 2 correctly.

Figure 9:
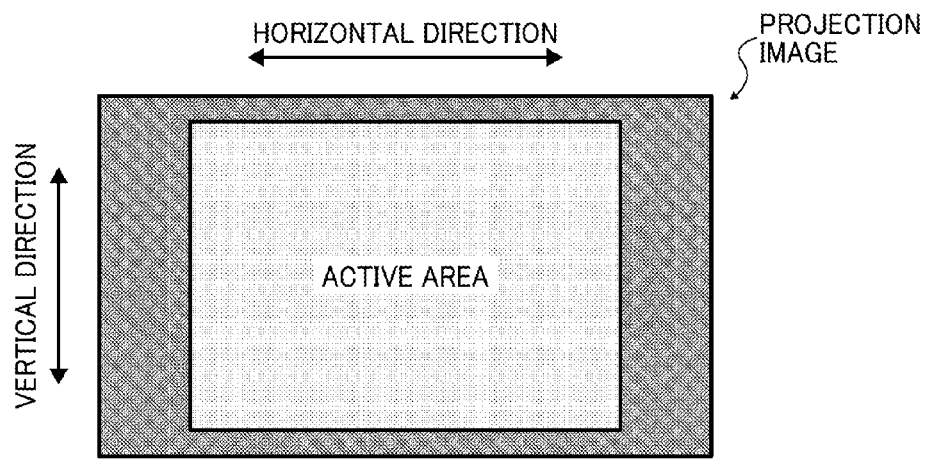
FIG. 9 is a projection image projected by an image projection apparatus.

If the format of image signal is erroneously determined, a ratio of effectively viewable area (e.g., active area indicated as grey area in FIG. 9) with respect to an entire projection image on the screen 2 may deviate from a normal value, a position of the active area with respect to an entire projection image may deviate from a normal value, and further a size magnification ratio of the active area in the vertical and horizontal directions may deviate from a normal value, with which abnormal image may occur. As such, erroneous determination of the image signal format includes, for example, erroneous determination of resolution level, erroneous determination of image area or the like.

Figure 10:
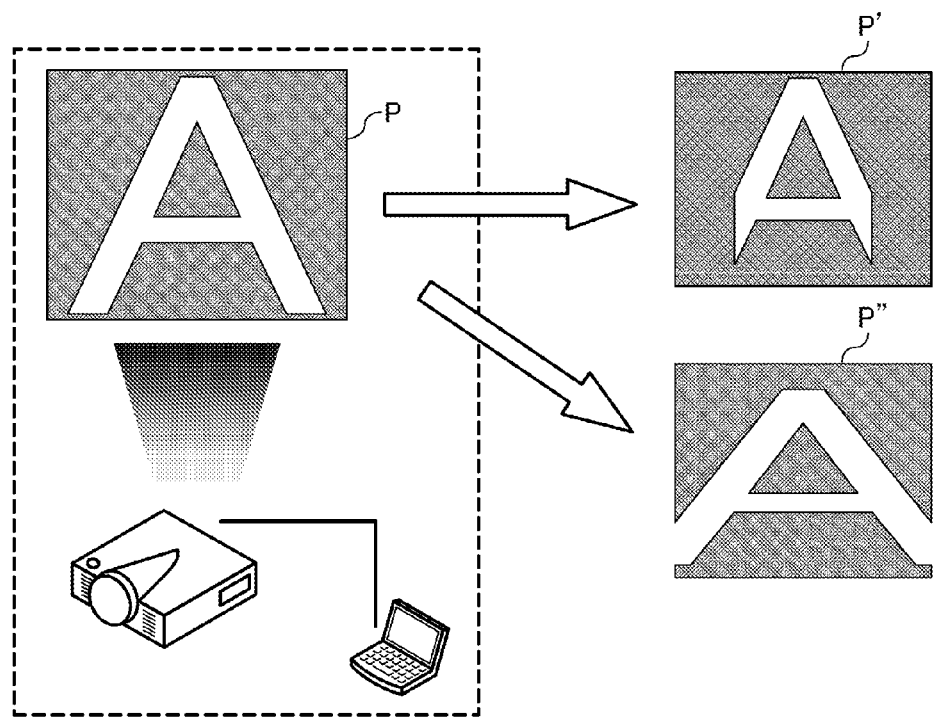
FIG. 10 illustrates an error occurring to a projection image projected by an image projection apparatus when an image signal is erroneously determined.

Specifically, when the image signal format is erroneously determined, for example, as illustrated in FIG. 10, a normal image of "A" indicated by reference sign P may be projected as an abnormal image of "A" indicated by reference signs P' or P" in FIG. 10, in which a part of the active area is cut or a shape of the active area is distorted.

Figure 11:
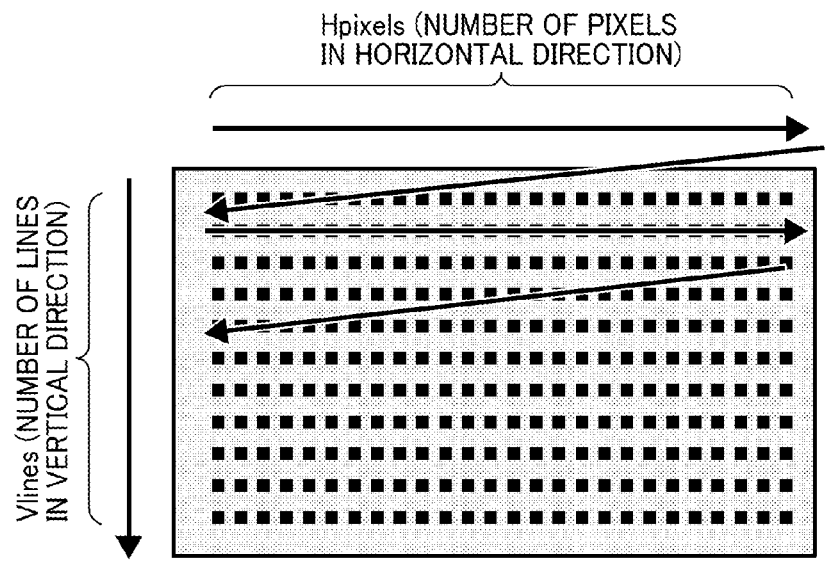
FIG. 11 is a configuration of an image signal.

As illustrated in FIG. 11, an image signal is composed of a plurality of pixel signals arranged in a matrix in the horizontal direction (H direction) and the vertical direction (V direction) time-wisely, which means the image signal includes a plurality of pixel signals arranged in the horizontal direction time-wisely, and a plurality of lines arranged in the vertical direction time-wisely, in which the image signal is an analog signal.

A format of each of a plurality of image signals can be defined by numerical values of a plurality of parameters. The inventor of the present invention has found that conventional integrated circuit (IC) chips cannot determine a difference between formats of a plurality of image signals when numerical values of two parameters of image signals are common.

The plurality of parameters is, for example, vertical resolution level (the number of lines per unit length in the vertical direction), horizontal resolution level (the number of pixel signals per unit length in the horizontal direction), vertical synchronization frequency (the number of re-writing times of frames per unit time), horizontal synchronization frequency number (the number of lines generated per unit time), vertical line number (the number of lines arranged in the vertical direction), the number of horizontal pixels (the number of pixel signals of each line), and signal generation time (time to generate one image signal from image data, which means time required for re-writing frames).

Figure 12:
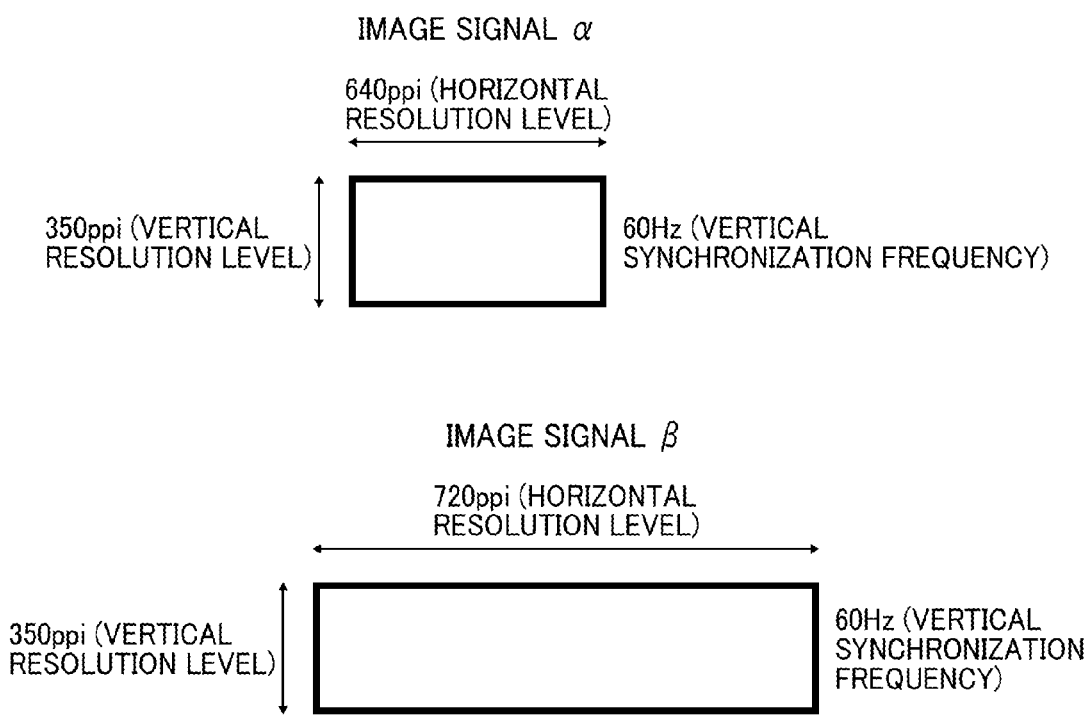
FIG. 12 illustrates two image signals set with a plurality of parameters, which are likely to be determined erroneously with each other.
Figure 14:
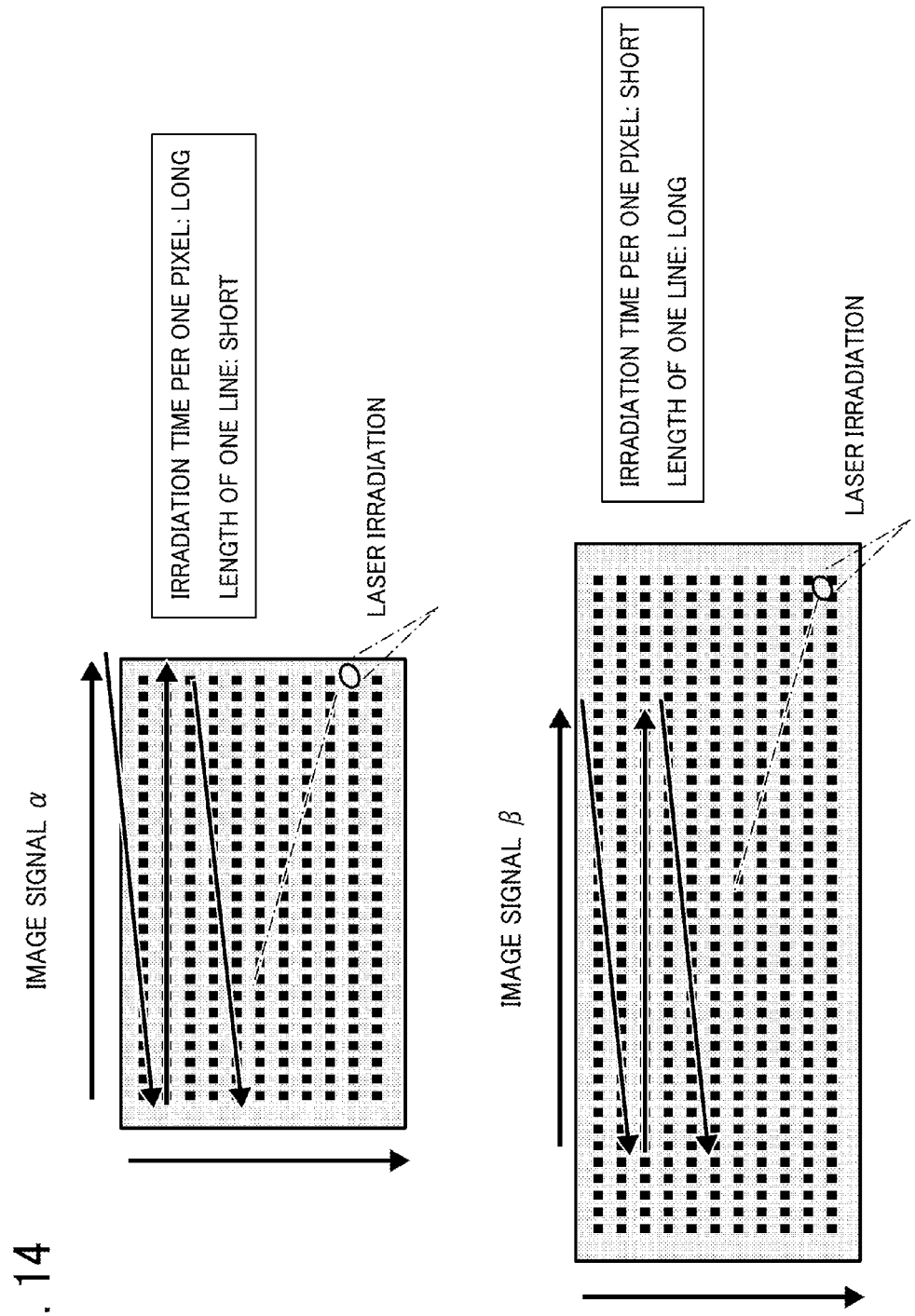
FIG. 14 illustrates two image signals, which are likely to be determined erroneously with each other.

The inventor has found that formats of a plurality of image signals (e.g., image signal α and image signal β) are difficult to distinguish, and the formats of the plurality of image signals (e.g., image signal α and image signal β) may be determined erroneously with each other by conventional integrated circuit (IC) chip used for signal determination. For example, in a case illustrated in FIG. 12, numerical values of the vertical resolution level and numerical values of the vertical synchronization frequency are both common (i.e., same) for image signal α and image signal β, and numerical values of the horizontal resolution level are different for image signal α and image signal β. In this case, formats of a plurality of image signals (e.g., image signal α and image signal β) are difficult to distinguish with each other, and the image signal α and the image signal β are likely determined erroneously with each other. Further, in this case, as illustrated in FIG. 14, because signal generation time of the plurality of image signals (e.g., image signal α and image signal β) is same, the plurality of image signals are more likely determined erroneously with each other.

Figure 13:
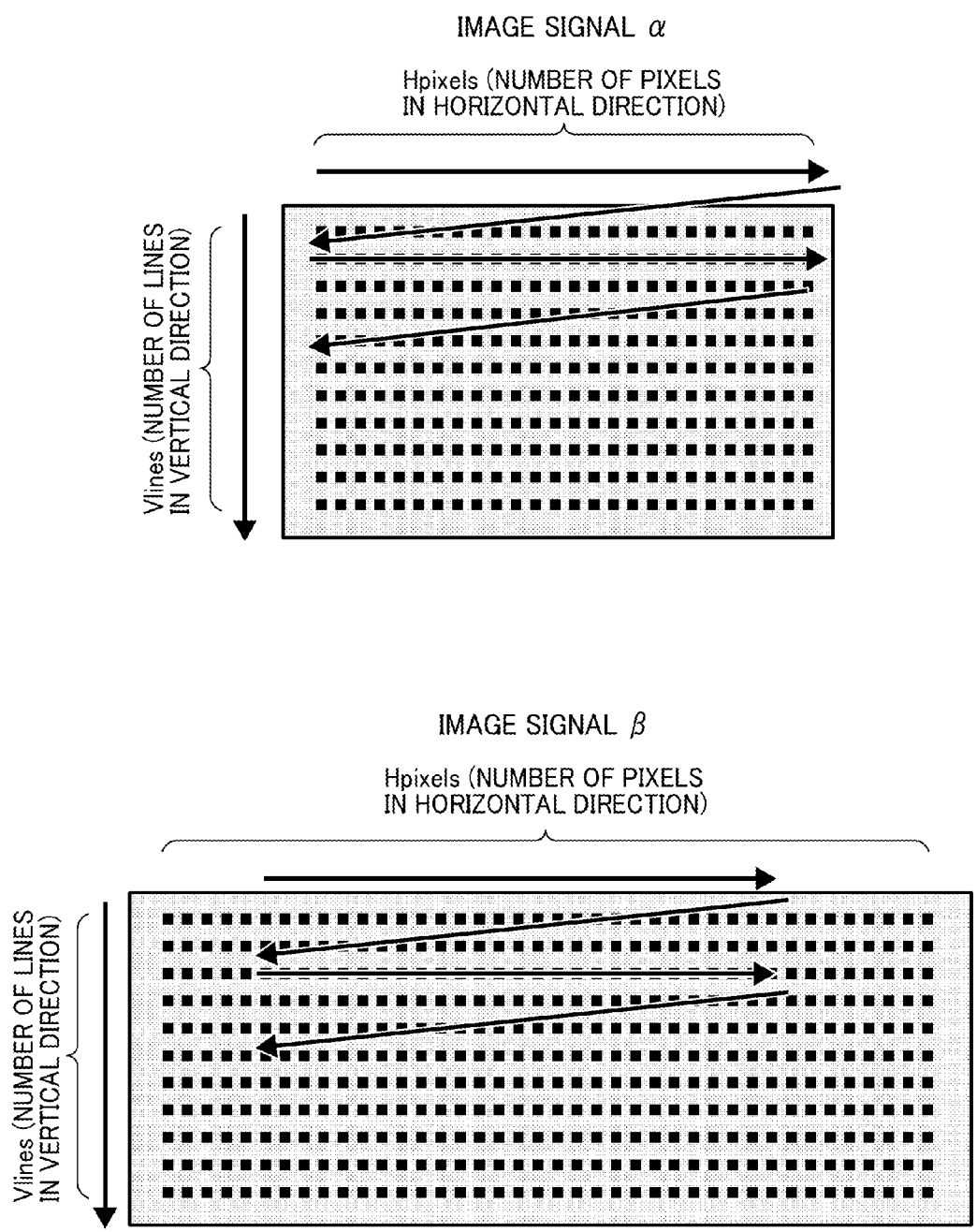
FIG. 13 illustrates two image signals, which are likely to be determined erroneously with each other.

Further, the inventor has found that formats of a plurality of image signals (e.g., image signal α and image signal β) are difficult to distinguish, and the formats of the plurality of image signals are determined erroneously with each other. For example, in a case illustrated in FIG. 13, numerical values of the vertical line number and numerical values of the vertical synchronization frequency are both common (i.e., same) for a plurality of image signals (e.g., image signal α and image signal (3), and the number of horizontal pixels is different for a plurality of image signals (e.g., image signal α and image signal β). In this case, formats of a plurality of image signals (e.g., image signal α and image signal β) are difficult to distinguish with each other, and the image signal α and the image signal β are likely determined erroneously with each other. Further, in this case, as illustrated in FIG. 14, because signal generation time of the plurality of image signals (e.g., image signal α and image signal β) is same, the plurality of image signals are more likely determined erroneously with each other.

In view of this situation, the projector 1 includes the signal determination apparatus 10 to determine a format of image signal correctly.

Figure 15:
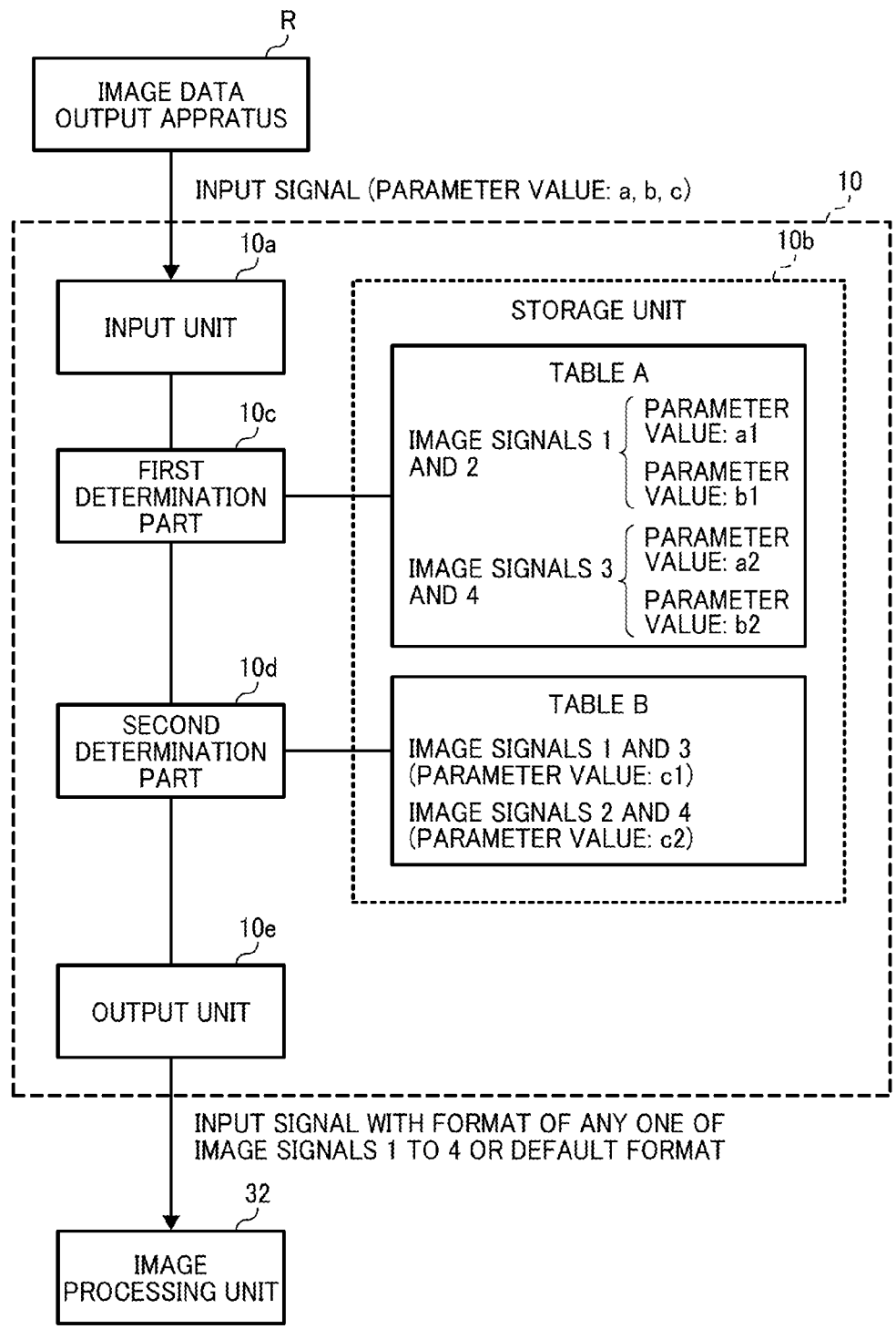
FIG. 15 is a block diagram of control configuration of a signal determination apparatus of a first example embodiment.

As illustrated in FIG. 15, the signal determination apparatus 10 includes, for example, an input unit 10a, a storage unit 10b, a first determination part 10c, a second determination part 10d, and an output unit 10e.

The input unit 10a is an interface for an input side of the signal determination apparatus 10. An image signal output from the image data output apparatus R is input to the input unit 10a of the signal determination apparatus 10, and the input image signal (hereinafter, also referred to "input signal") is transmitted to the first determination part 10c.

The storage unit 10b stores Table A storing, for example, four parameter values a1, a2, b1, b2, and Table B storing, for example, two parameter values c1, c2 for defining or identifying formats of a plurality of image signals such as four image signals such as image signals 1 to 4 in a case of FIG. 15. A parameter value means a numerical value of a parameter.

The storage unit 10*b* may be a memory or a disk used as a storage or a carrier medium, in which data can be erased and written/re-written, or a read only memory or disk used as a storage or carrier medium.

In an example case, image signals 1 to 4 have following example parameters.

Image signal 1: VGA Graphic 350 lines@70 Hz (Mode 640×350)

Image signal 2: VGA Graphic 400 lines@70 Hz (Mode 640×400)

Image signal 3: VGA Text 350 lines@70 Hz (Mode 720×350)

Image signal 4: VGA Text 400 lines@70 Hz (Mode 720×400)

In this description, parameter value a1 is assumed as numerical value of the vertical resolution level for image signals 1 and 2, and parameter value a2 is assumed as numerical value of the vertical resolution level for image signals 3 and 4. Further, parameter value b1 is assumed as numerical value of the vertical synchronization frequency for image signals 1 and 2, and parameter value b2 is assumed as numerical value of the vertical synchronization frequency for image signals 3 and 4. Further, parameter value c1 is assumed as numerical value of the horizontal resolution level for image signals 1 and 3, and parameter value c2 is assumed as numerical value of the horizontal resolution level for image signals 2 and 4.

Therefore, in this example case, it is assumed that a1=350 (ppi), a2=400 (ppi), b1=70.07 (Hz), b2=70.08 (Hz), c1=640 (ppi), and c2=720 (ppi), wherein "ppi" means pixel per inch.

In this example case, Table A stores parameter values (a1, b1) that are common to image signals 1 and 2, and parameter values (a2, b2) that are common to image signals 3 and 4. Further, Table B stores parameter value c1 that may be common to image signals 1 and 3, and parameter value c2 that may be common to image signals 2 and 4.

Upon receiving an image signal (i.e., input signal) from the input unit 10*a*, if parameter values (a, b) of the input signal match parameter values (a1, b1) or (a2, b2) included in Table A, the first determination part 10*c* determines that a format of the input signal is included in a format of two image signals (image signals 1 and 2, or image signals 3 and 4) defined by parameter values (a1, b1) or (a2, b2), and transmits the determination result and an input signal to the second determination part 10*d*. In this example case, parameter value "a" of the input signal is the vertical resolution level of the input signal, and parameter value "b" of the input signal is the vertical synchronization frequency of the input signal. The first determination part 10*c* can use conventional IC chips for signal determination. In this description, matching of parameter values (x, y) and parameter values (xN, yN) means x=xN, and y=yN.

Upon receiving the determination result of the first determination part 10*c* and the input signal from the first determination part 10*c*, if parameter value "c" of the input signal matches parameter values ca or c2 included in Table B, which means when the format of the input signal is included in a format of image signals 1 and 3 or a format of image signals 2 and 4, the second determination part 10*d* determines that the format of the input signal is a format of one image signal (any one of the image signals 1 to 4) defined by parameter values (a1, b1) or (a2, b2), and parameter values c1 or c2. Then, the second determination part 10*d* transmits the determination result and the input signal to the output unit 10*e*. In this example case, parameter value "c" of the input signal is the horizontal resolution level of the input signal. The second determination part 10*d* can employ an IC chip improved from conventional IC chips.

In the above described configuration, the determination unit configured with the first determination part 10*c* and the second determination part 10*d* can determine a format of input signal based on numerical values of three parameters of the input signal, and numerical values of three parameters stored in the storage unit 10*b*.

Specifically, when three parameter values of the input signal match corresponding three parameter values for defining any one image signal from four image signals 1 to 4 stored in the storage unit 10*b*, the determination unit (first determination part 10*c* and second determination part 10*d*) determines that the format of the input signal is a format of the one image signal among the four image signals.

Upon receiving the determination result of the second determination part 10*d* and the input signal from the second determination part 10*d*, the output unit 10*e* outputs the input signal with a format (i.e., format of any one of the image signals 1 to 4) corresponding to the determination result to the image processing unit 32.

The image processing unit 32 generates a modulated signal based on the input signal having the above described format received from the output unit 10*e*.

Figure 16:
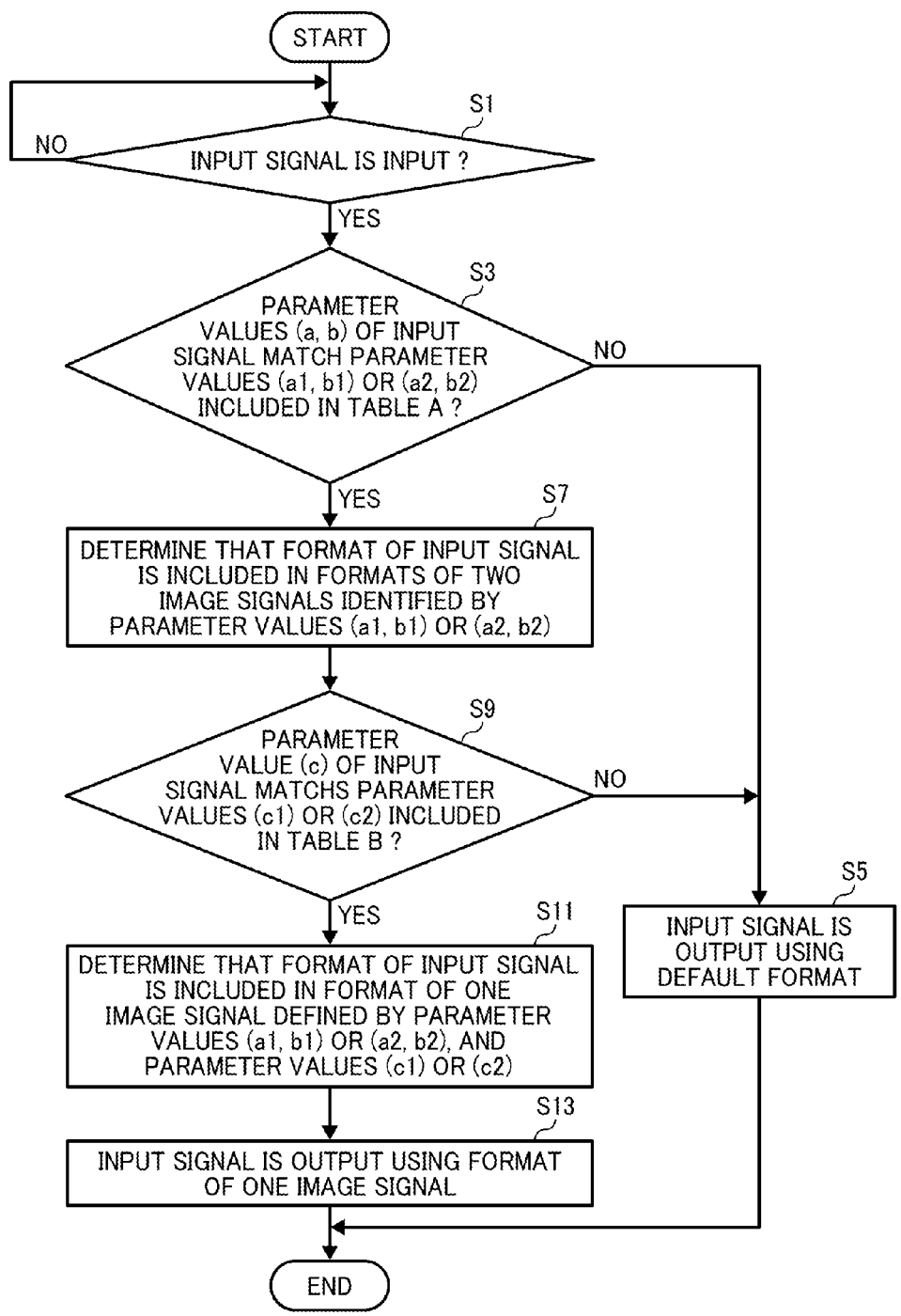
FIG. 16 is a flow chart showing the steps of control by the signal determination apparatus of the first example embodiment.

A description is given of a control by the signal determination apparatus 10 with reference to FIG. 16. FIG. 16 is a flow chart showing the steps of control based on a process algorism of a central processing unit (CPU) included in the signal determination apparatus 10. Before the control process, Tables A and B are stored in the storage unit 10*b*, which means before step S1 of FIG. 16, a step of storing the Tables A and B in the storage unit 10*b* is conducted.

At step S1, the CPU determines whether an input signal exists, which means the CPU determines whether an image signal output from the image data output apparatus R is input via the input unit 10*a*. If the CPU determines that an image signal is not input at step S1, the process at step S1 is repeated. If the CPU determines that an image signal is input at step S1, the process proceeds to step S3.

At step S3, by referring Table A stored in the storage unit 10*b*, the CPU determines whether parameter values (a, b) of the input signal match parameter values (a1, b1) or (a2, b2) included in Table A, in which it is determined whether a=a1 and b=b1, or a=a2 and b=b2 can be confirmed. If the determination at step S3 is not-matching of parameters, the process proceeds to step S5. If the determination at step S3 is matching of parameters, the process proceeds to step S7.

At step S5, the CPU outputs the input signal with a default format (i.e., initial setting). In this case, if a plurality of parameter values of the input signal and a plurality of corresponding parameter values of the default format (i.e., initial setting) do not match, a projection image may have abnormality as described above. In this situation, it is preferable that a user operates a control unit or operation unit of the projector 1 to adjust the projection image manually. When step S5 is conducted, the process ends.

At step S7, the first determination part 10*c* determines that the format of the input signal is included in a format of one of two image signals (i.e., image signals 1 and 2 or image signals 3 and 4) defined or identified by parameter values (a1, b1) or (a2, b2).

At step S9, by referring Table B stored in the storage unit 10*b*, the CPU determines whether parameter value c of the input signal matches parameter values c1 or c2 included in Table B. If the determination at step S9 is not-matching of parameters, the process proceeds to step S5. If the determination at step S9 is matching of parameters, the process proceeds to step S11.

At step S11, the second determination part 10d determines that the format of input signal is a format of one of the image signal 1 to 4 defined or identified by parameter values (a1, b1) or (a2, b2) and parameter values c1 or c2, in which it is determined which one of the image signals 1 to 4 matches the input signal based on the determination result at step S7 and the determination result at step S11.

At step S13, the output unit 10e outputs the input signal with a format of the determined one image signal (i.e., any one of the image signals 1 to 4). When step S13 is conducted, the process ends.

The above described signal determination apparatus 10 of the first example embodiment includes the storage unit 10b and the determination unit that determines a format of input signal. For example, the storage unit 10b stores numerical values (parameter values) of, for example, at least three parameters (e.g., vertical resolution level, vertical synchronization frequency, horizontal resolution level) for defining or identifying a format of each of a plurality of image signals (e.g., four image signals). Based on the numerical values of at least three parameters of an input image signal (i.e., input signal) and the numerical values of the at least three parameters stored in the storage unit 10b, the determination unit can determine a format of the input signal.

In this configuration, formats of a plurality of image signals having common numerical values for two parameters can be determined distinguishly.

Therefore, the signal determination apparatus 10 can prevent erroneously determination of a format of an input image signal.

In the above described configuration, the determination unit includes the first determination part 10c and the second determination part 10d, and three parameters such as vertical resolution level, vertical synchronization frequency and horizontal resolution level are used as example parameters. When numerical values of at least two parameters (e.g., vertical resolution level and vertical synchronization frequency) of the at least three parameters of the input image signal match numerical values of corresponding at least two parameters (e.g., vertical resolution level and vertical synchronization frequency) common to at least two image signals of the plurality of image signals stored in the storage unit 10b, the first determination part 10c determines that a format of the input image signal is included in a format of one of the at least two image signals. Further, based on numerical value of at least another one parameter (e.g., horizontal resolution level) of the at least three parameters of the input image signal, and numerical value of corresponding at least another one parameter (e.g., horizontal resolution level) stored in the storage unit 10b, the second determination part 10d determines a format of the input image signal is included in a format of one of the at least two image signals.

In this configuration, because the determination of a format of input image signal can be conducted at two steps by the first determination part 10c and the second determination part 10d, control at each of the first determination part 10c and the second determination part 10d can be simplified, and processing load at each one of the first determination part 10c and the second determination part 10d can be reduced.

Further, the first determination part 10c can use relatively low cost IC chips used for conventional signal determination, with which low cost of apparatus can be devised.

Further, the second determination part 10d can use relatively low cost IC chips used for conventional signal determination by improving IC chips, with which low cost of apparatus can be devised.

Further, the projector 1 includes, for example, the signal determination apparatus 10 and the optical engine unit 30 used as a projection unit. The signal determination apparatus 10 is input with an image signal from the image data output apparatus R. The optical engine unit 30 projects modulated light on a surface of the screen 2 (i.e., projection face) based on an image signal using a format determined by the signal determination apparatus 10.

In this configuration, the signal determination apparatus 10 can determine a format of image signal correctly or high precision, and an image prepared from image data received from the image data output apparatus R can be correctly projected onto the screen 2.

Further, the determination at step S3 can be conducted by the first determination part 10c in the first example embodiment. Further, the determination at step S9 can be conducted by the second determination part 10d in the first example embodiment.

Further, in the first example embodiment, the input unit 10a can be omitted, but a function of the input unit 10a can be included to the first determination part 10c. Further, the output unit 10e can be omitted, but a function of the output unit 10e can be included to the second determination part 10d.

A description is given of other example embodiments, in which different points from the first example embodiment are described while the same or similar points of the first example embodiment may not be described.

Second Example Embodiment

Figure 17:
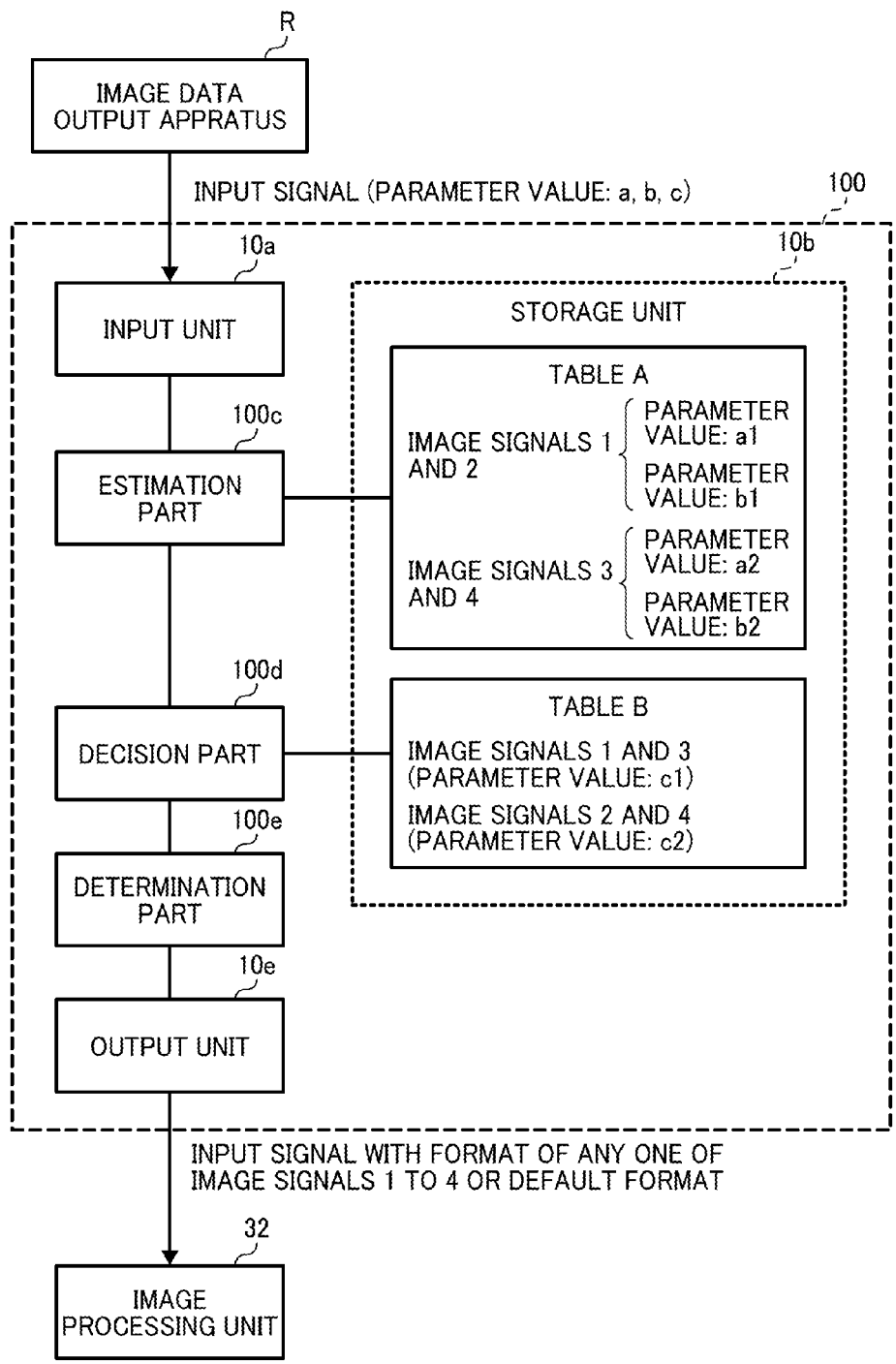
FIG. 17 is a block diagram of control configuration of a signal determination apparatus of a second example embodiment.
Figure 18:
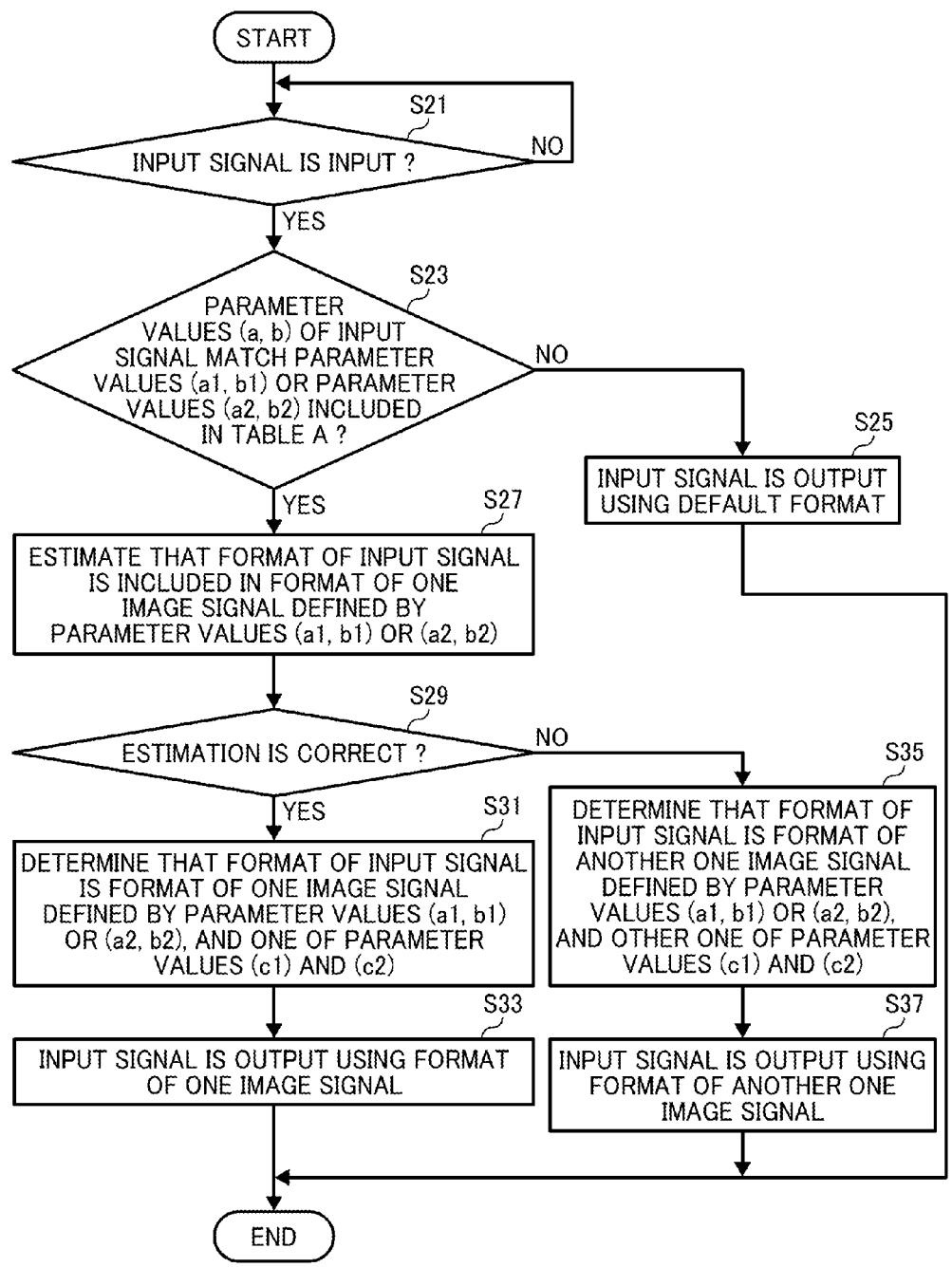
FIG. 18 is a flow chart showing the steps of control by the signal determination apparatus of the second example embodiment.

A signal determination apparatus of a second example embodiment has a configuration and control different from the first example embodiment as illustrated in FIGS. 17 and 18. As illustrated in FIG. 17, a second signal determination apparatus 100 includes, for example, the input unit 10a, a storage unit 10b, an estimation unit 100c, a decision part 100d, a determination part 100e, and the output unit 10e.

When parameter values (a, b) of the image signal (i.e., input signal) received from the input unit 10a match parameter values ($a_1$, b1) or (a2, b2) included in Table A, the estimation unit 100c estimates that the format of the input signal is a format of one image signal (image signals 1 or 2) defined by parameter values (a1, b1), or a format of another one image signal (image signals 3 or 4) defined by parameter values (a2, b2), and transmits an estimation result (one image signal or another one image signal) and the input signal to the decision part 100d. Further, the estimation unit 100c selects a format of one image signal from two image signals having common parameter values (one image signal from image signals 1 and 2, or one image signal from image signals 3 and 4) (e.g., automatically selects a format of one of image signals such as a smaller number signal or a greater number signal). The estimation unit 100c can use conventional IC chip used for conventional signal determination.

By referring Table B stored in the storage unit 10b, the decision part 100d determines whether the estimation result by the estimation unit 100c is correct, and transmits a determination result and the input signal to the determination part 100e. Specifically, when parameter value "c" of the input signal matches parameter values c1 or c2 included in Table B, which means when the format of the input signal is included in a format of image signals 1 and 3, or a format of image signals 2 and 4, the decision part 100*d* determines whether the estimation result by the estimation unit 100*c* is correct.

When the above mentioned estimation result is image signals 1 or 3, and parameter value "c" of the input signal matches parameter value c1, the decision part 100*d* determines that the estimation result is correct. Further, when the above mentioned estimation result is image signals 1 or 3, and parameter value "c" of the input signal matches parameter value c2, the decision part 100*d* determines that the estimation result is wrong.

Further, when the above mentioned estimation result is the image signals 2 or 4, and parameter value "c" of the input signal matches parameter value c1, the decision part 100*d* determines that the estimation result is wrong. Further, when the above mentioned above estimation result is the image signals 2 or 4, and parameter value "c" of the input signal matches parameter value c2, the decision part 100*d* determines that the estimation result is correct.

Upon receiving a determination result of the decision part 100*d* and the input signal from the decision part 100*d*, the determination part 100*e* determines that the format of the input signal is one image signal (any one of the image signals 1 to 4) defined or identified by parameter values (a1, b1) or (a2, b2) and parameter value c1 or c2, and transmits a determination result and the input signal to the output unit 10*e*.

In the above described configuration of the second example embodiment, the determination unit configured with the estimation unit 100*c*, the decision part 100*d* and the determination part 100*e* can determine the format of the input signal based on numerical values of three parameters of the input signal, and numerical values of three parameters stored in the storage unit 10*b*. Specifically, when three parameter values of the input signal match corresponding three parameter values for defining one image signal from four image signals 1 to 4 stored in the storage unit 10*b*, the determination unit determines that the format of the input signal is a format of the one image signal of the four image signals 1 to 4.

A description is given of control by the signal determination apparatus 100 with reference to FIG. 18. FIG. 18 is a flow chart showing the steps of control based on a process algorism of a CPU included in the signal determination apparatus 100. Before the control process, Tables A and B are stored in the storage unit 10*b*.

At step S21, the CPU determines whether an input signal exists. If the CPU determines that an image signal does not exist at step S21, the process at S21 is repeated. If the CPU determines that an image signal exists at step S21, the process proceeds to step S23.

At step S23, the CPU determines whether parameter values (a, b) of the input signal match parameter values (a1, b1) or (a2, b2) included in Table A. If the determination at step S23 is not-matching of parameter, the process proceeds to step S25. If the determination at step S23 is matching of parameter, the process proceeds to step S27.

At step S25, the CPU outputs the input signal with a default format (i.e., initial setting). When step S25 is conducted, the process ends.

At step S27, the estimation unit 100*c* estimates that the format of input signal is a format of one image signal (any one of image signals 1 to 4) defined by parameter values (a1, b1) or (a2, b2).

At step S29, the decision part 100*d* compares parameter value "c" of the input signal and parameter values c1 and c2 included in Table B, and determines whether an estimation result by the estimation unit 100*c* is correct. In this description, it is assumed that parameter value "c" may match one of parameter values c1 and c2. The parameter value "c" can be used to determine whether an estimation result of the estimation unit 100*c* (i.e., format of one image signal) is correct. If parameter value "c" of the input signal matches one of parameter values c1 and c2, the determination at step S29 is affirmed (i.e., correct). Further, if parameter value c of the input signal, matches another one of parameter values c1 and c2, the determination at step S29 is not affirmed (i.e., not correct). If the determination at step S29 is NO (i.e., estimation result is not affirmed), the process proceeds to step S35. If the determination at step S29 is YES (i.e., estimation result is affirmed At step S31, the determination part 100*e* determines that the format of input signal is a format of one image signal (any one of image signals 1 to 4) defined by parameter values (a1, b1) or (a2, b2) and any one of parameter values c1 or c2.

At step S33, the output unit 10*e* outputs the input signal with a format of the one image signal to the image processing unit 32.

At step S35, the determination part 100*e* determines that the format of the input signal is a format of another one image signal (any one of image signals 1 to 4) defined by parameter values (a1, b1) or (a2, b2) and another one of parameter values c1 and c2.

Then, at step S37, the output unit 10*e* outputs the input signal with a format of another image signal to the image processing unit 32.

As to the signal determination apparatus 100 of the second example embodiment, the determination unit includes the estimation unit 100*c* and the decision part 100*d*. When numerical values of at least two parameters (e.g., vertical resolution level and vertical synchronization frequency) of at least three parameters of the input image signal match numerical values of corresponding at least two parameters (e.g., vertical resolution level and vertical synchronization frequency) common to at least two image signals of a plurality of image signals (e.g., four image signals) stored in the storage unit 10*b*, the estimation unit 100*c* estimates that a format of input image signal is a format of one image signal of the at least two image signals. Further, when a numerical value of at least another one parameter (e.g., horizontal resolution level) of the at least three parameters of the input image signal stored in the storage unit 10*b* matches a numerical value of corresponding at least another one parameter (e.g., horizontal resolution level) for defining the one image signal, the decision part 100*d* determines that a format of the input image signal is a format of the one image signal.

Further, when a numerical value of at least another one parameter (e.g., horizontal resolution level) of at least three parameters of the input image signal matches a numerical value of corresponding at least another one parameter (e.g., horizontal resolution level) for defining another image signal of the at least two image signals stored in the storage unit 10*b*, the decision part 100*d* determines that a format of the input image signal is a format of the another one image signal.

The signal determination apparatus 100 of the second example embodiment can devise the same effect of the first example embodiment. Further, because the estimation result of the estimation unit 100*c*, which means one image signal (i.e., one image signal or another one image signal) is transmitted to the decision part 100*d*, data amount to be transmitted to the decision part 100d can be reduced, with which processing load at the decision part 100d can be reduced.

Further, in the second example embodiment, the determination at step S23 can be conducted by the estimation unit 100c. Further, the determination at step S29 can be conducted by the above mentioned CPU or the determination part 100e, in which the decision part 100d is not required.

Further, in the second example embodiment, the input unit 10a can be omitted, but a function of the input unit 10a can be included to the estimation unit 100c. Further, the output unit 10e can be omitted, but a function of the output unit 10e can be included to the determination part 100e.

Third Example Embodiment

Figure 19:
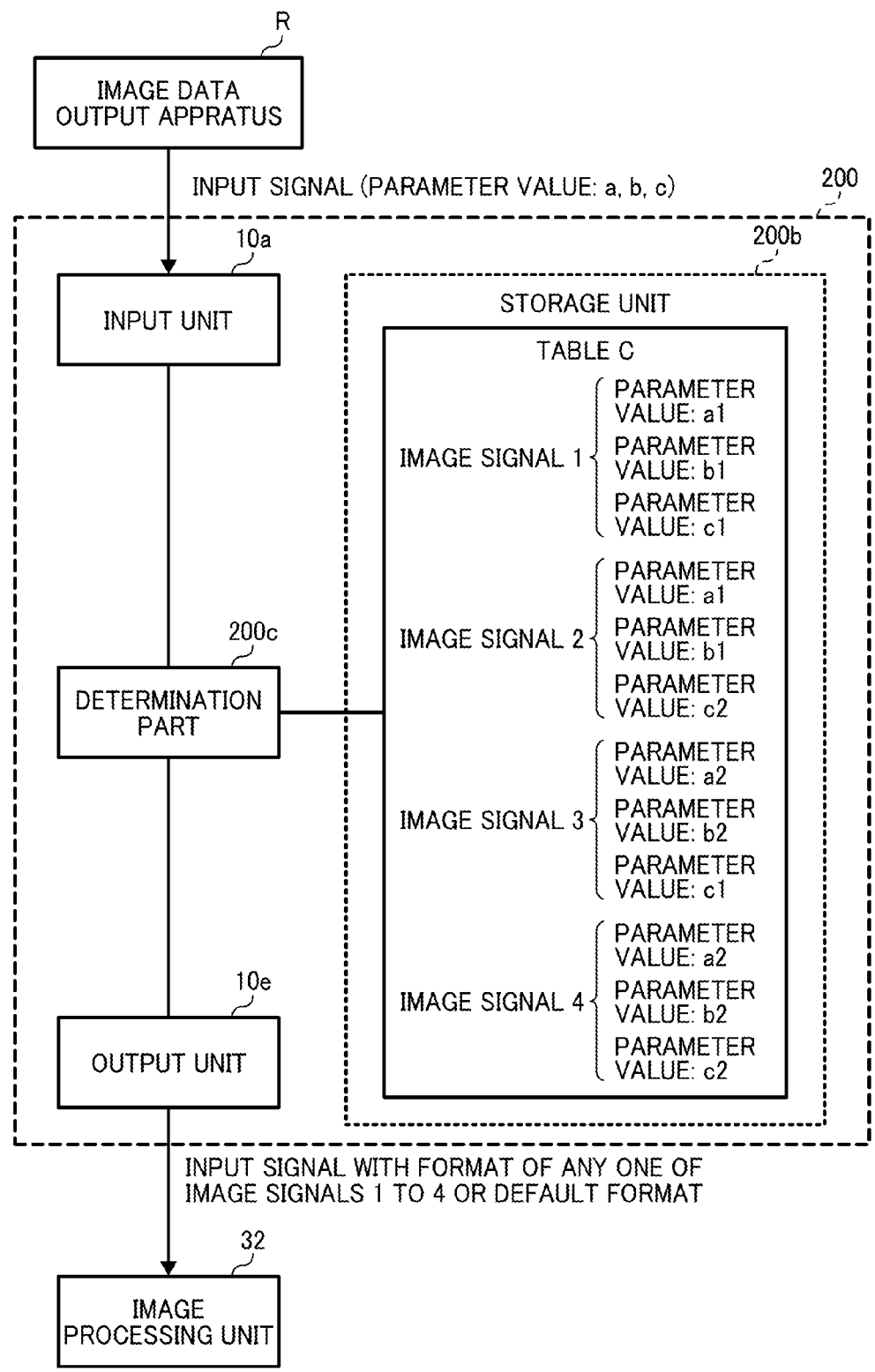
FIG. 19 is a block diagram of control configuration of a signal determination apparatus of a third example embodiment.

A signal determination apparatus of a third example embodiment has a configuration and control different from the first and second example embodiments as illustrated in FIGS. 19 and 20.

As illustrated in FIG. 19, in the third example embodiment, a signal determination apparatus 200 includes, for example, the input unit 10a, a storage unit 200b, a determination part 200c, and the output unit 10e.

The storage unit 200b stores Table C storing parameter values (a1, b1, c1) of image signal 1, parameter values (a1, b1, c2) of image signal 2, parameter values (a2, b2, c1) of image signal 3, and parameter values (a2, b2, c2) of image signal 4.

The storage unit 200b may be a memory or a disk used as a storage or a carrier medium, in which data can be erased and written/re-written, or a read only memory or a disk used as a storage or a carrier medium.

Upon receiving an input signal from the input unit 10a, if parameter values (a, b, c) of the input signal match any one of parameter values (a1, b1, c1), (a1, b1, c2), (a2, b2, c1), (a2, b2, c2) included in Table C stored in the storage unit 200b, the determination part 200c determines that format of the input signal is a format of one image signal (any one of image signals 1 to 4) defined by any one of parameter values (a1, b1, c1), (a1, b1, c2), (a2, b2, c1), (a2, b2, c2) that has matched to parameter values (a, b, c). In this description, matching of parameter values (x, y) and parameter values (xN, yN, zN) means x=xN, y=yN and z=zN.

The determination part 200c determines a format of the input signal based on numerical values of three parameters of the input signal, and numerical values of three parameters stored in the storage unit 10b. Specifically, if three parameter values of the input signal match corresponding three parameter values for defining any one image signal of four image signals 1 to 4 stored in the storage unit 10b, the determination part 200c determines that a format of the input signal is a format of the one image signal of the four image signals 1 to 4.

A description is given of control by the signal determination apparatus 200 with reference to FIG. 20. FIG. 20 is a flow chart showing the steps of control based on a process algorism of a CPU included in the signal determination apparatus 200. Before the control process, Table C is stored in the storage unit 200b.

At step S41, the CPU determines whether input signal exists. If the CPU determines that an image signal does not exist at step S41, the process at step S41 is repeated. If the CPU determines that an image signal exists at step S41, the process proceeds to step S43.

At step S43, the CPU determines whether parameter values (a, b, c) of the input signal match any one of parameter values (a1, b1, c1), (a1, b1, c2), (a2, b2, c1), (a2, b2, c2) included in Table C. If the determination at step S43 is not-matching of parameter, the process proceeds to step S45. If the determination at step S43 is matching of parameter, the process proceeds to step S47.

At step S45, the input signal is output with a default format (i.e., initial setting).

At step S47, the determination part 200c determines that a format of input signal is a format of one image signal (any one of image signals 1 to 4) defined by any one of parameter values (a1, b1, c1), (a1, b1, c2), (a2, b2, c1), (a2, b2, c2) that has matched to parameter values (a, b, c).

At step S49, the output unit 10e outputs the input signal with a format of the one image signal of the image signals 1 to 4 to the image processing unit 32.

The above described signal determination apparatus 200 of the third example embodiment can devise the same effect of the signal determination apparatuses of the first and second example embodiments while simplifying the control configuration.

Further, in the third example embodiment, the input unit 10a can be omitted, but a function of the input unit 10a can be included to the determination part 200c. Further, the output unit 10e can be omitted, but a function of the output unit 10e can be included to the determination part 200c.

The above described signal determination apparatus of the first to third example embodiments can determine a format of an input signal correctly based on numerical values of at least three parameters for defining a format of each of a plurality of image signals, stored in the storage unit 10b, and numerical values of corresponding at least three parameters of the input signal, In the above described configuration, a format of an image signal not stored in the storage unit can be defined by storing numerical values of at least three parameters of the image signal in the storage unit as required, with which a greater number of formats of image signals can be determined correctly. Further, as to the signal determination apparatus of the first to third example embodiments, image formats of at least two input signals can be correctly determined, which means image formats of a plurality of input signals can be correctly determined.

As to the above described first to third example embodiments, the number of image signals stored in the storage unit is not limited four. The number of image signals stored in the storage unit can be a plurality of numbers such as four.

Further, as to the first to third example embodiments, type of parameters of each image signal stored in the storage unit is not limited three. The number of type of parameters of each image signal can be three or more. Further, the storage unit preferably stores numerical values of at least three types of parameters selected from horizontal resolution level, vertical resolution level, vertical synchronization frequency, horizontal synchronization frequency number, clock frequency, vertical line number, the number of horizontal pixels, and signal generation time.

Further, as to the first to third example embodiments, the number of each parameter value stored in the storage unit is not limited two. The number of each parameter value stored in the storage unit can be one or more.

As to the first to third example embodiments, for example, parameter value "a" is set as a numerical value of vertical resolution level, parameter value "b" is set as a numerical value of the vertical synchronization frequency), and parameter value "c" is set as a numerical value of the horizontal resolution level, but not limited hereto.

It is preferable that at least two parameter values for defining a format of each of a plurality of image signals are included or stored in Table A, and at least one parameter value for defining a format of each of the plurality of image signals is included or stored in Table B. Further, at least one parameter value for defining a format of each of the plurality of image signals can be included or stored in Table A, and at least two parameter values for defining a format of each of the plurality of image signals can be included or stored in Table B. Further, it is preferable that at least three parameter values for defining a format of each of the plurality of image signals is included or stored in Table C.

For example, instead of a numerical value of the vertical resolution level, parameter value "a" can be a numerical value of any one of horizontal resolution level, vertical synchronization frequency, horizontal synchronization frequency number, clock frequency (the number of pixel signals generated per unit time), vertical line number, the number of horizontal pixels, and signal generation time.

For example, instead of a numerical value of the vertical synchronization frequency, parameter value "b" can be a numerical value of any one of vertical resolution level, horizontal resolution level, horizontal synchronization frequency number, clock frequency (the number of pixel signals generated per unit time), vertical line number, the number of horizontal pixels, and signal generation time.

For example, instead of a numerical value of the horizontal resolution level, parameter value "c" can be a numerical value of any one of vertical synchronization frequency, horizontal synchronization frequency number, clock frequency (the number of pixel signals generated per unit time), vertical line number, the number of horizontal pixels, and signal generation time.

For example, a numerical value of horizontal resolution level and a numerical value of vertical resolution level can be included or stored in Table A, and a numerical value of any one of vertical synchronization frequency, horizontal synchronization frequency number, clock frequency (the number of pixel signals generated per unit time), vertical line number, the number of horizontal pixels, and signal generation time can be included or stored in Table B.

A description is given of an example case. For example, image signal η (VGA Graphic 350 lines @70 Hz) and image signal ϲ (VESA 640×350 @85 Hz) have common parameters. In this case, a numerical value of 640 (ppi) of the horizontal resolution level and a numerical value of 350 (ppi) of the vertical resolution level can be included or stored in Table A, and at least any one of parameters such as a numerical value 70.07 (Hz) of vertical synchronization frequency, a numerical value 31.46 (kHz) of horizontal synchronization frequency number, a numerical value 25.17 (MHz) of clock frequency, a numerical value 800 (pixels) of the number of horizontal pixels, and a numerical value 449 (lines) of vertical line number for defining a format of the image signal η can be included or stored in Table B, and further, at least any one of parameters such as a numerical value 85.08 (Hz) of the vertical synchronization frequency, a numerical value 37.86 (kHz) of horizontal synchronization frequency number, a numerical value 31.50 (MHz) of clock frequency, a numerical value 832 (pixels) of the number of horizontal pixels, and a numerical value 445 (lines) of vertical line number for defining a format of the image signal ϵ can be included or stored in Table B.

For example, as to the second example embodiment, it is assumed that a numerical value 350 ppi of the vertical resolution level and a numerical value 70 Hz of the vertical synchronization frequency common to two image signals (e.g., 640×350@ 70 Hz and 720×350@ 70 Hz) are included or stored in Table A, and numerical values of clock frequency (e.g., 25.173 (MHz) and 25.177 (MHz)) for each of the two image signals are included or stored in Table B.

In this case, for example, if the estimation unit estimates that a format of the input signal is a format of image signal of 640×350@70 Hz, and when a numerical value of clock frequency of the input signal matches the numerical value 25.173 (MHz) of clock frequency included in Table B, the decision part determines that an estimation result by the estimation unit is correct, and the determination part determines that the format of the input signal is the format of image signal of 640×350@70 Hz.

Further, if the estimation unit estimates that a format of the input signal is a format of image signal of 640×350@70 Hz, and when a numerical value of clock frequency of the input signal matches the numerical value 25.177 (MHz) of clock frequency included in Table B, the decision part determines that an estimation result by the estimation unit is wrong, and the determination part determines the format of the input signal is the format of image signal of 720×350@70 Hz.

Further, if the estimation unit estimates that a format of the input signal is a format of image signal of 720×350@70 Hz, and when a numerical value of clock frequency of the input signal matches the numerical value 25.177 (MHz) of clock frequency included in Table B, the decision part determines that an estimation result at the estimation unit is correct, and the determination part determines that the format of the input signal is the format of image signal of 720×350@70 Hz.

Further, if the estimation unit estimates that a format of the input signal is a format of image signal of 720×3 50@70 Hz, and when a numerical value of clock frequency of the input signal matches the numerical value 25.173 (MHz) of clock frequency included in Table B, the decision part determines that an estimation result at the estimation unit is wrong, and the determination part determines that the format of the input signal is the format of image signal of 650× 350@70 Hz.

Further, as to the first to third example embodiments, the projector 1 is employed as an optical projection apparatus, but other apparatus such as a headcap display for vehicles can be employed as the optical projection apparatus.

As to the first to third example embodiments, erroneously determination of format input image signal can be prevented.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A signal determination apparatus for determining a format of an input image signal input from an image data output apparatus, comprising:
   a storage unit to store numerical values of at least three parameters for defining a format of each of a plurality of image signals; and
   a determination unit to determine a format of the input image signal based on numerical values of at least three parameters of the input image signal and the numerical values of at least three parameters stored in the storage unit, wherein the determination unit includes an estimation part and a determination part,
   wherein when numerical values of at least two parameters of the at least three parameters of the input image signal match numerical values of corresponding at least two parameters common to at least two image signals of the plurality of image signals stored in the storage unit, the estimation part estimates a format of the input image signal is a format of one image signal of the at least two image signals,
   wherein when a numerical value of at least one parameter, other than the at least two parameters, of the at least three parameters of the input image signal matches a numerical value of corresponding at least one parameter, other than the at least two parameters, for defining a format of the one image signal stored in the storage unit, the determination part determines that a format of the input image signal is a format of the one image signal.

2. The signal determination apparatus of claim 1, wherein when a numerical value of at least one parameter, other than the at least two parameters, of the at least three parameters of the input image signal matches a numerical value of corresponding at least one parameter, other than the at least two parameters, for defining a format of another one image signal of the at least two image signals stored in the storage unit, the determination part determines a format of the input image signal is a format of the another one image signal.

3. The signal determination apparatus of claim 1, wherein the at least three parameters are selectable from horizontal resolution level, vertical resolution level, vertical synchronization frequency, horizontal synchronization frequency number, clock frequency, vertical line number, the number of horizontal pixels, and signal generation time.

4. An optical projection apparatus comprising:
   the signal determination apparatus of claim 1 inputable with an image signal from an image data output apparatus; and
   a projection unit to project light modulated based on the image signal having a format determined by the signal determination apparatus to a projection face.

5. A method of determining a format of an image signal output from an image data output apparatus, comprising:
   storing numerical values of at least three parameters for defining a format of each of a plurality of image signals in a storage unit; and
   determining a format of the output image signal based on numerical values of the at least three parameters of the output image signal and the numerical values of the at least three parameters stored in the storage unit, wherein the determining step includes:
   estimating a format of the input image signal is a format of one image signal of the at least two image signals when numerical values of at least two parameters of the at least three parameters of the input image signal match numerical values of corresponding at least two parameters common to at least two image signals of the plurality of image signals stored in the storage unit; and
   determining a format of the input image signal is a format of the one image signal when a numerical value of at least one parameter, other than the at least two parameters, of the at least three parameters of the input image signal matches a numerical value of corresponding at least one parameter, other than the at least two parameters, for defining a format of the one image signal stored in the storage unit.

6. The signal determination method of claim 5, wherein the determining step includes:
   determining a format of the input image signal is a format of the another one image signal when a numerical value of at least one parameter, other than the at least two parameters, of the at least three parameters of the input image signal matches a numerical value of corresponding at least one parameter, other than the at least two parameters, for defining a format of another one image signal of the at least two image signals stored in the storage unit.

7. A non-transitory computer-readable storage medium storing a program that, when executed by a computer having a processing circuit, causes the computer to execute a method of determining a format of an image signal output from an image data output apparatus, comprising:
   storing numerical values of at least three parameters for defining a format of each of a plurality of image signals in a storage unit; and
   determining a format of the output image signal based on numerical values of the at least three parameters of the output image signal and the numerical values of the at least three parameters stored in the storage unit, wherein the determining step includes:

estimating a format of the input image signal is a format of one image signal of the at least two image signals when numerical values of at least two parameters of the at least three parameters of the input image signal match numerical values of corresponding at least two parameters common to at least two image signals of the plurality of image signals stored in the storage unit; and determining a format of the input image signal is a format of the one image signal when a numerical value of at least one parameter, other than the at least two parameters, of the at least three parameters of the input image signal matches a numerical value of corresponding at least one parameter, other than the at least two parameters, for defining a format of the one image signal stored in the storage unit.

* * * * *